United States Patent
McInerny

(10) Patent No.: US 10,354,256 B1
(45) Date of Patent: Jul. 16, 2019

(54) AVATAR BASED CUSTOMER SERVICE INTERFACE WITH HUMAN SUPPORT AGENT

(71) Applicant: Amazon Technologies, Inc., Reno, NV (US)

(72) Inventor: Michael James McInerny, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 632 days.

(21) Appl. No.: 14/581,981

(22) Filed: Dec. 23, 2014

(51) Int. Cl.
*G06F 3/048* (2013.01)
*G06Q 30/00* (2012.01)
*G06T 13/40* (2011.01)

(52) U.S. Cl.
CPC .......... *G06Q 30/016* (2013.01); *G06T 13/40* (2013.01)

(58) Field of Classification Search
CPC .............................. G06Q 30/016; G06T 13/40
USPC ....................................................... 715/706
See application file for complete search history.

(56) References Cited

U.S. PATENT DOCUMENTS

| | | | | |
|---|---|---|---|---|
| 2002/0007276 A1* | 1/2002 | Rosenblatt | ............. | G06Q 30/02 704/260 |
| 2009/0285483 A1* | 11/2009 | Guven | ................. | G06Q 30/016 382/181 |
| 2010/0324941 A1* | 12/2010 | Stevenson | .............. | G06N 3/006 705/4 |
| 2011/0075819 A1* | 3/2011 | Bruce | ................. | H04M 3/5191 379/88.04 |
| 2013/0198039 A1* | 8/2013 | Sridharan | ............ | G06Q 30/016 705/26.44 |

* cited by examiner

*Primary Examiner* — Tadesse Hailu
*Assistant Examiner* — Darrin Hope
(74) *Attorney, Agent, or Firm* — Lindauer Law, PLLC

(57) ABSTRACT

A method and system are provided that provide an avatar based customer service experience with a human support agent. The methods and systems receive, from a customer computing (CC) device, a request for assistance fulfillable by one of a plurality of support agents. The methods and systems launch an avatar-based exchange that includes receiving customer issue definition (CID) information from the CC device regarding the request for assistance, defining a virtual character to be presented on the CC device; and providing pre-recorded support (PRS) content based on the CID information. The PRS content is presented in combination with animation of the virtual character. The methods and systems select a support agent, and transition a basis for the avatar-based exchange from the PRS content to support agent content such that the support agent communicates with the customer through the virtual character animated on the CC device.

20 Claims, 10 Drawing Sheets

AVATAR BASED CUSTOMER SERVICE INTERFACE WITH HUMAN SUPPORT AGENT

BACKGROUND

The use of computing devices by users having varying levels of technical expertise generates new opportunities for providing improved user experiences through convenient and effective customer support. In-person customer support at retail locations and computer service centers can provide a high level of service, but travelling to a physical location may be inconvenient for the customer and the cost of maintaining the staff and facilities at such a location can be undesirably high. Customer support by e-mail might be more convenient as it permits the user to initiate the service request from any location, but results in undesirable delays due to the asynchronous nature of e-mail communication. Telephone support may provide improved response time and a more personal interaction with the support agent, but due to varying user levels of technical expertise and the limitations of voice communications, it may be challenging for the user to clearly communicate the problem being experienced and challenging for the support agent to clearly communicate the steps needed to resolve the problem.

Today, interactive on-line customer support is offered. For example, when a customer experiences problems with setup or operation of a product or service, the customer may go on-line with a network based customer service tool that offers the customer the option to see and speak with a user support agent. However, in many services, the customer has to wait on hold for an extended period of time before a user support agent becomes available and is inter-connected with the customer. At least one on-line support service is presently offered that seeks to enhance a customer's support experience by presenting a "picture in picture" window on the display of the customer device, where the window includes a video feed of a face of the human support agent helping the customer.

However, existing customer support services experience limits. For example, some services seek to interconnect the support agent with the customer in a relatively quick period of time. To maintain short connection delays, a large number of support agents is utilized and the interconnections are closely managed to limit an amount of time that any customer is not connected to a support agent. Also, in order to present a window with a video feed of the face of the support agent on the customer computing device, the service utilizes a relatively large amount of bandwidth to convey video images of the support agent's face with sufficient resolution to provide convincing images of the support agent during a support session.

DETAILED DESCRIPTION

Figure 1:
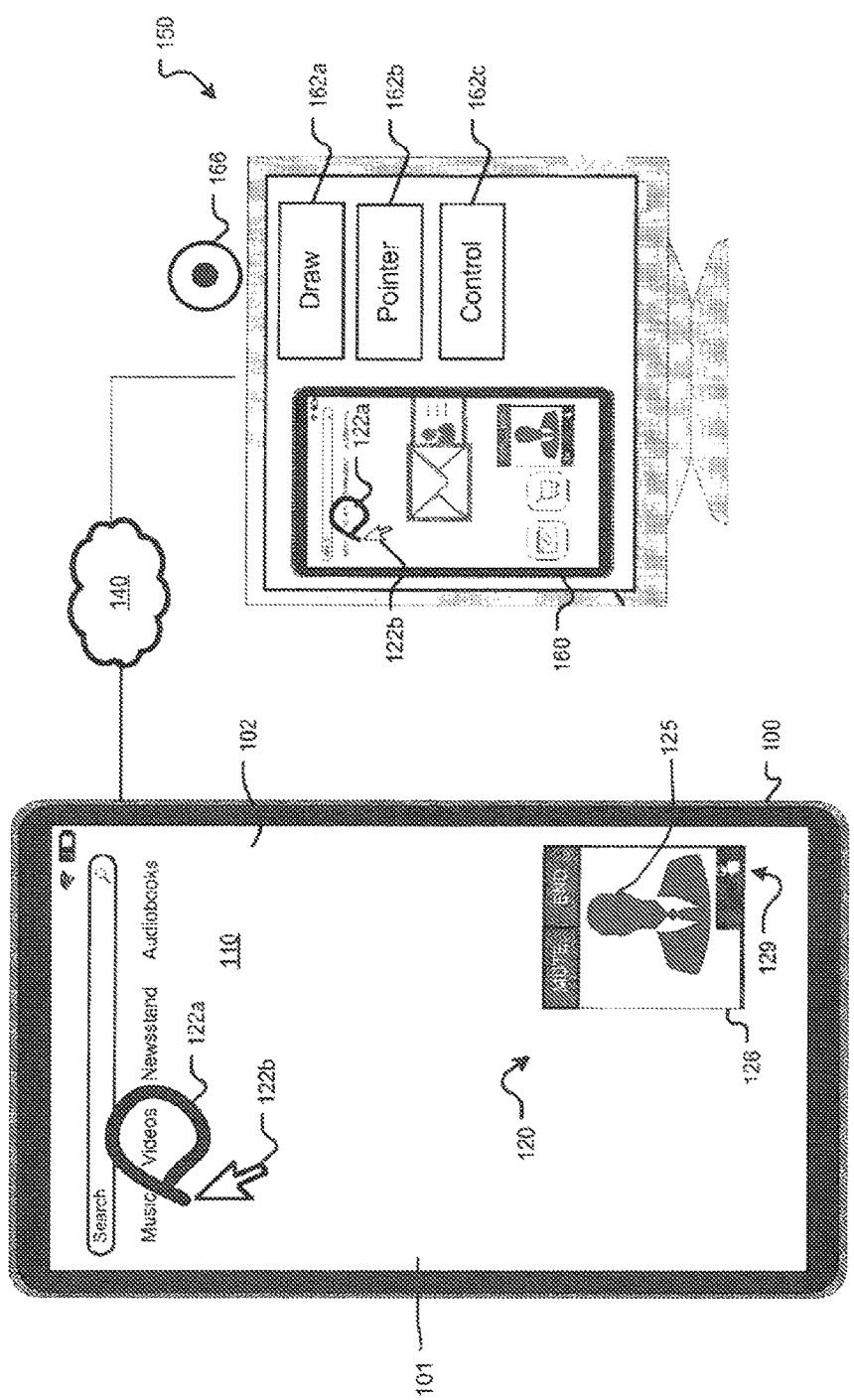
FIG. 1 is a block diagram illustrating a communication system in accordance with embodiments herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In embodiments herein, systems and methods are provided to improve the customer experience when seeking support for a product or service through an on-line network based support service. By way of example, when a customer uses a computing device (e.g., a tablet computer, smart phone, laptop computer, desktop computer, etc.) to initiate a network based support session, the service may prompt the customer to answer a few questions regarding where/why the customer needs help. The service initiates a support session in which an animated graphical virtual character or "avatar" is displayed to the customer on the customer computing (CC) device. The virtual character is presented to the customer very quickly (e.g. somewhat instantaneously) once the customer submits an initial request for assistance. For example, the avatar may receive a request for assistance, such as a question regarding how to do something, such as assemble a product, implement a feature/function on the CC device or another computing device, a customer's explanation of a problem with a product or service, and the like. By initiating a support session and presenting a virtual character support window immediately after a customer request, embodiments herein help alleviate anxiety that the customer might otherwise experience regarding how long the customer may need to wait "on hold" for a support agent.

The virtual character immediately engages the customer in a dialogue by talking and listening to the customer. For example, the avatar may ask the customer questions regarding the nature of a problem (e.g., "How can I help you?"). Through the question and answer process, the avatar collects information from the customer.

Some customer requests for assistance are more common than others. Accordingly, common requests for information may have pre-recorded support content saved in connection therewith such that, when a common request for information is asked, the service provides the customer with the pre-recorded support content without (or before) a live support agent interconnecting with the customer. The pre-recorded support content is presented to the customer through animation of the avatar. The avatar is configured to present the pre-recorded support content in various manners, such as audibly (by talking) while presenting animation of realistic facial expressions. As the avatar talks, the graphical illustration of the avatar's face is animated, for example, in a manner corresponding to what the avatar says (e.g., lips and mouth move in a manner synchronized with and corresponding to the speech). As a further example, the facial expressions may convey emotion based on the support situation, such as an expression of concern or interest while "listening" to the customer explaining the problem, an expression of concentration while "figuring out" how to deal with the customer's problem, an expression of frustration or understanding when a problem cannot be solved, a smile in response to a successful step or operation taken by the customer, and the like. By using an animated graphical avatar to communicate with the customer, the support service immediately engages the customer regarding the customer's support topic through an exchange environment that is more customer friendly and satisfying than prior services. The customer is not required to read printed instructions or step through a series of menus and/or enter numbers to pick between options. While the present methods and systems provide pre-recorded support content (when applicable), the customer is not required to read various pages or windows with text answers to "frequently asked questions". Instead, the customer is presented with an avatar-based support exchange through which the customer can listen to, and watch, the avatar when receiving the support content.

In some instances, an automated system response may be sufficient to fulfill the customer's request. However, often an automated system response may not be sufficient. Accordingly, it is desirable to hand-off avatar control in a "seamless" manner from the pre-recorded support content to a real human agent, referred to herein as a support agent or customer support agent. In accordance with embodiments herein, when a human support agent becomes available to assist a customer, the service continues to present the virtual character or avatar to the customer, in order that the customer never experiences a transition in the service interface. Instead, behind the scenes, the service transitions a basis for control of the avatar to a real human agent seamlessly without the customer noticing a drastic change in the support experience. To do so, when the avatar initiates an exchange with a customer, the service also initiates a support agent selection process. The service seeks to identify a live human support agent who is available to talk with the customer regarding the customer's support topic. The service selects a support agent from the plurality of support agents, often before the agent is available.

When the agent becomes available, the service transitions control of the avatar-based exchange from an exchange driven by pre-recorded support content to an exchange driven by a human support agent. When the support agent is connected with the customer, the service continues to present the avatar on the customer computing device, with the support agent communicating with the customer through the avatar. The avatar repeats the comments made by the support agent, and the facial expressions of the avatar correspond to the facial expressions of the support agent. By communicating through the avatar in the foregoing manner, the service switches between prerecorded and live support through seamless transition (that is not apparent to the customer) from the pre-recorded support content to a live support agent. As used herein, the terms "seamless" and "seamless transition" refer to a change in a basis for control of an avatar-based exchange between prerecorded support content and support agent content, without the customer being aware of the change. In other words, the transition is seamless from the customer's perspective. For example, the methods and systems seamlessly transition a basis for animation of, and audio output from, the virtual character between the PRS content and the support agent content without changing a virtual character spoken voice or appearance of the virtual character. For the avoidance of doubt, before and after the seamless transaction, the avatar-based exchange presents a common virtual character exhibiting consistent appearance and animation before and after the transition, regardless of whether the avatar-based exchanges is based on PRS content or based on support agent content. Further, the avatar-based exchange presents voice audio data to the customer in a common voice/dialect (VC spoken voice) before and after the seamless transition. The communication through an avatar limits an extent to which the customer may feel that support has been outsourced to a remote support center.

In accordance with embodiments herein, the support agent acts as a virtual facial puppeteer. For example, the service may use automatic facial recognition to encode facial expressions of the support agent. The encoded facial expressions are transmitted over the network (as CDU data) to the customer computing device, where the customer computing device then maps the facial expressions onto the avatar displayed in real-time. The encoded facial expressions may be encoded using very little data that can then be transmitted utilizing very low bandwidth when conveyed to the customer computing device. The service allows a continuous presentation of a human-like face which encompasses both live and pre-recorded presentations. The service presents, to the customer, a common avatar for prerecorded and real-time support regardless of the human support agent who is actually enlisted to respond to the customer.

FIG. 1 is a block diagram illustrating a communication system in accordance with embodiments herein. A user utilizing a first computing device, such as a customer computing (CC) device 100, connects to a second computing device, such as the customer support agent (SA) computing device 150, via a network 140. The network 140 includes, for example, the Internet, intranets, extranets, wide area networks (WANs), local area networks (LANs), wired networks, wireless networks, or other suitable networks, or any combination of two or more such networks. The communications system is scalable to any number of customer computing devices 100 and SA computing devices 150, and scalable to any number of virtual characters. For example, embodiments herein facilitate scalability by distributing the virtual rendering processes between numerous customer computing devices 100. Hence, as the number of customer computing devices 100 increases, bottle-necks are avoided in the virtual processing computing resources (e.g., if a single central network processor performed all virtual rendering processing). Further, embodiments herein provide increased security and increased privacy to both customers and support agents by avoiding display to the customer of actual video images of the support agent during support sessions.

The computing device 100 includes a user interface 101 and display 102. The user interface (UI) 101 and display 102 may represent a common component or may represent separate physical or functional components. The display 102 may be touch sensitive to form at least a portion of the UI 101. The UI 101 may be defined as an operating system user interface or the interface of one or more software applications that may run on the computing device 100. The UI 101 enables a user to enter UI content 110. When the user launches a customer support application on the computing device 100 and initiates a screen sharing function, the user interface content 110 currently being displayed on the computing device 100 is transmitted to the support agent computing device 150 when a support agent (also referred to as a customer support agent) is connected to the customer.

The support agent computing device 150 runs a customer support application, which then displays a screen sharing image 160 of the content 110 displayed on the user's computing device 100. The screen sharing image 160 enables the customer support representative to better assist the user by presenting the representative with a live feed of the user's computing device 100.

The customer support application may also provide the agent with one or more support tools 162a-162c, which the agent may utilize to respond to the user's inquiries or requests for assistance. In the illustrated embodiment, the customer support application includes a drawing tool 162a, a pointer tool 162b, and a control tool 162c. The agent may utilize peripheral input devices of the agent computing device 150, such as, for example, a mouse and a keyboard, to select one of the tools 162a-162c and then interact with the screen sharing image 160 using that tool to produce the desired result on the user's computing device 100.

The drawing tool 162a provides a graphics editor function that enables the agent to utilize one or more graphics tools to create graphical elements 122 to be displayed on top of the user's content 110. The pointer tool 162b provides the agent with a graphical element comprising a pointer 122b that the agent can move about the screen without leaving a trail or other persistent image, as would occur if using the drawing tool 162a. The agent may move the pointer 122b over the surface of the user's content 110 to draw the user's attention to various elements displayed.

In other situations, it may be desirable for the customer service agent to perform tasks directly on the user's computing device 100. The control input tool 162c provides the agent with the ability to produce inputs that are received by the user's computing device 100 and recognized as user inputs as if the user had provided those inputs using, for example, the touch-screen display 102. The control input tool 162c may provide the agent with a pointer or other cursor that the agent may move across the surface of the content 110 using the mouse, with touch inputs being generated using, for example, the buttons on the agent's mouse or keyboard. The control input tool 162c may be useful when the support agent wishes to perform functions or tasks directly onto the user's computing device 100, rather than merely explain to the user what the user should do, as may be the case when utilizing the drawing tool 162a or pointer tool 162b.

In other embodiments, the customer support application may provide the customer support agent with other support tools not shown in FIG. 1. For example, the customer support application may include a library of pre-generated support graphics which may be selected by the customer support agent to be transmitted for display on the user's computing device 100. These pre-generated support graphics may comprise static images and/or animations. This may be particularly useful for teaching users the solutions to common problems. For example, after a user indicates that he needs assistance with connecting to a wireless network, the customer support agent may select a pre-generated graphic or animation that teaches the user how to access the appropriate settings menu for connecting to a wireless network.

The support agent computing device 150 includes a webcam 166 or other video capture device for capturing support agent video data of the support or customer service agent using the computing device 150. The support agent video data is analyzed through image analysis to identify facial expressions and other features of interest, in connection with determining the support agent video data to be converted to virtual character animation data (e.g., CDU data). When a support session is initiated, the computing device 100 displays an interface exchange element 120. The interface exchange element 120 may contain additional graphical elements and/or controls, such as, for example, a virtual character animation portion 126. The virtual character animation portion 126 displays an animated virtual character 125 (also referred to as an avatar). The virtual character 125 and the VC spoken voice are selected based on various information, such as described herein in connection with FIG. 3. The computing device 100 displays the animated virtual character 125 and outputs synthesized audio from virtual character voice audio data. In the illustrated embodiment, the virtual character animation portion 126 includes an information portion, displaying text, such as the agent's name, and one or more control icons 129, which, when selected by the user, can perform various functions. In this embodiment, if the user wishes to relocate the position of the agent interface element 120, the user can select the control icon 129 and drag the agent interface exchange element 120 across the display. Additional controls may also be displayed to enable the user to perform additional functions, such as muting the live chat using mute control and ending the support session using end control.

Figure 2:
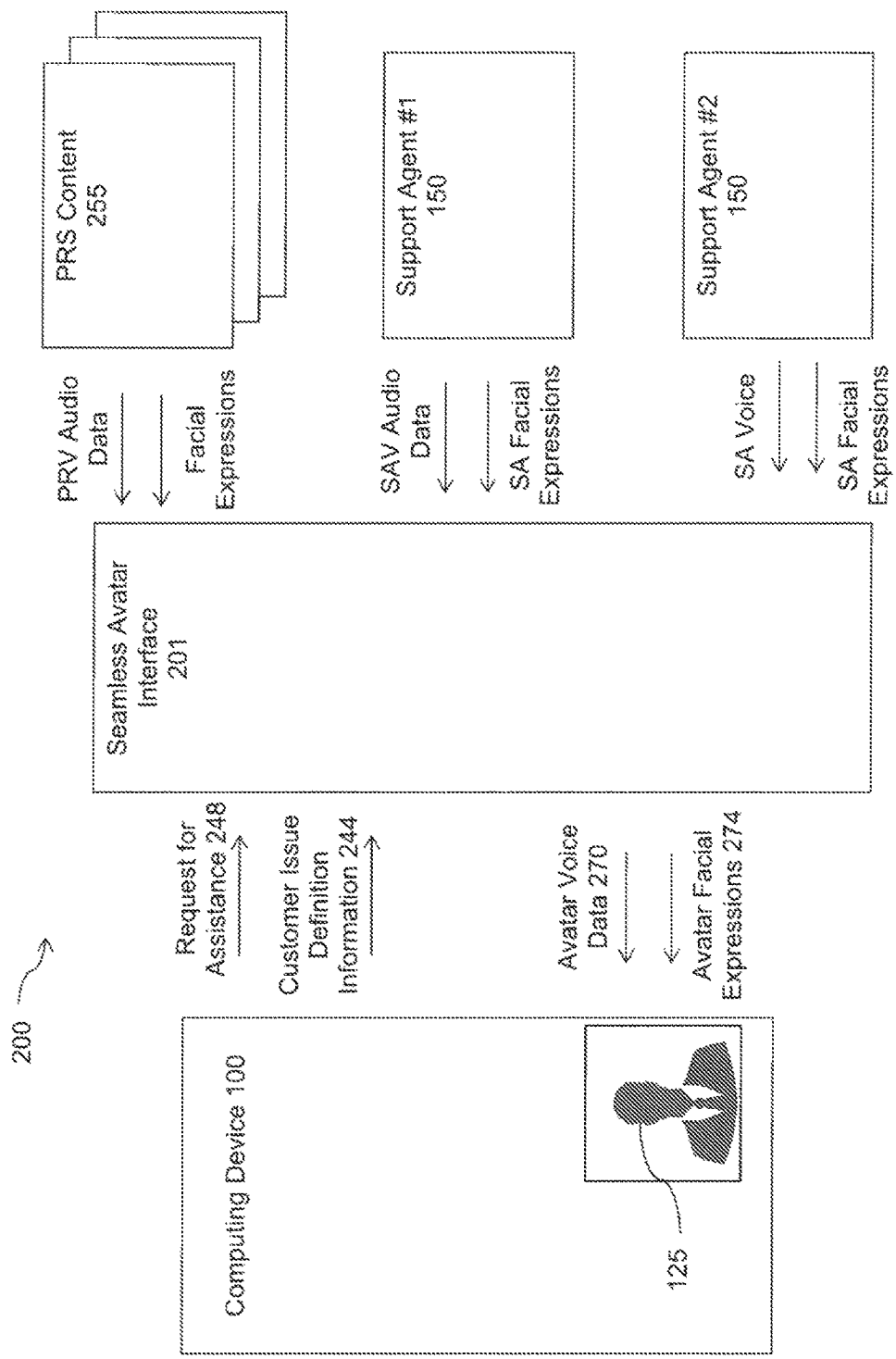
FIG. 2 illustrates a representation of content transfer between various components within the system in accordance with embodiments herein.

FIG. 2 illustrates a representation of content transfer between various components within the system in accordance with embodiments herein. FIG. 2 illustrates the computing device 100 that, based upon customer input, provides a request for assistance 248 to a support system 200. The support system 200 includes various components (as explained in accordance with various embodiments herein) to establish a seamless avatar interface 201 through which information and data are passed between the customer computing device 100 and at least one support agent computing device 150. In the example of FIG. 2, first and second support agent computing devices 150 are illustrated (as denoted at #1 and #2). The support system 200 also includes a storage of prerecorded support (PRS) content 255 that is stored in connection with common requests for information (e.g. common user questions, common problems experienced by customers and the like).

During a support session, the user enters, at the computing device 100, customer issue definition (CID) information 244 indicative of the nature of the problem or question, for which the customer seeks assistance. The CID information 244 is processed by the support system 200 to identify related PRS content 255 (when it exists) and to select a support agent to provide human-based real-time support. The PRS content 255 is provided to the seamless avatar interface 201. In the example of FIG. 2, the PRS content 255 is provided as prerecorded voice (PRV) audio data and facial expressions (although, the facial expressions may not be associated with specific PRS content). The seamless avatar interface 201 converts the prerecorded voice audio data to virtual character voice audio data (referred to as avatar voice data 270 in FIG. 2). The seamless avatar interface 201 converts the facial expressions provided in connection with PRS content 255 into virtual character definition and update (VDU) data (referred to as avatar facial expressions 274 in FIG. 2). The CDU data is used by the computing device 100 to render the virtual character or avatar 125 and to provide animation in connection there with while playing the avatar voice data 270. The seamless avatar interface 201 maintains an avatar-based exchange between the support system 200 and the computing device 100 where audio and animation information presented by the avatar 125, within the avatar-based exchange, is based on the PRV audio data and facial expressions from the PRS content 255.

When a support agent (e.g. #1) is selected, the basis of control of the avatar-based exchange is switched to the support agent #1. The support agent computing device 150 provides support agent voice (SAV) audio data and support agent facial expressions to the seamless avatar interface 201. The seamless avatar interface 201 converts the SAV audio data to virtual character voice audio data. The seamless avatar interface 201 converts the support agent facial expressions into CDU data. The SAV audio data and CDU data (based on input from the support agent computing device 150) are provided to the computing device 100. The computing device 100 animates the avatar 125 based on the CDU data. The computing device 100 plays back messages and other audio content spoken by the support agent (as SAV audio data) through the voice of the avatar 125.

As a support session transitions from prerecorded support content, to one support agent, and/or to another support agent, the avatar voice data and avatar facial expressions (more generally CDU data) operate to present a consistent virtual character with a consistent voice regardless of whether the underlying content originated from prerecorded support content, support agent #1, or support agent #2, or elsewhere.

Figure 3:
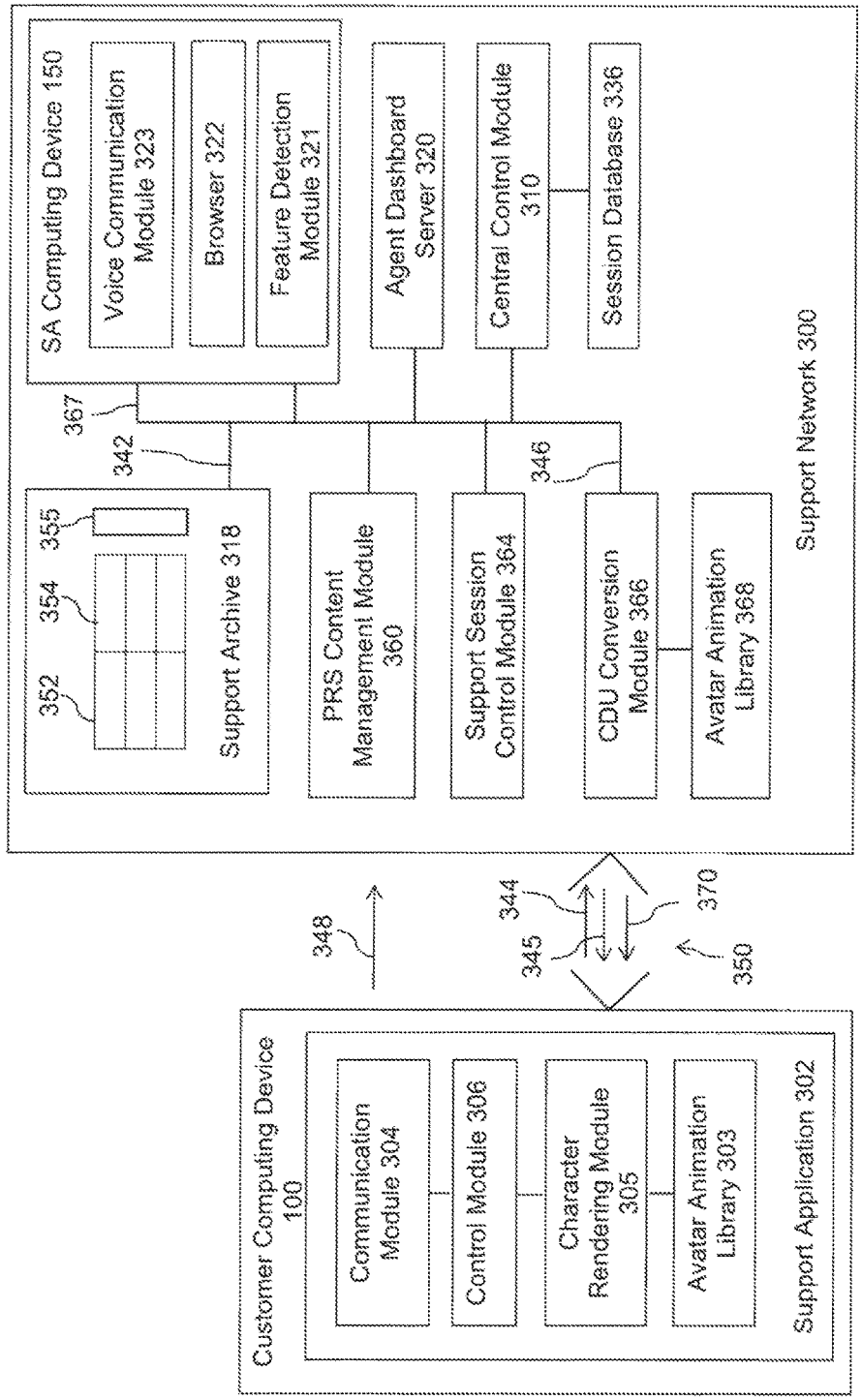
FIG. 3 is a block diagram illustrating an exemplary environment in which embodiments may be implemented in accordance with embodiments herein.

FIG. 3 is a block diagram illustrating an exemplary environment in which embodiments may be implemented. Although various components are illustrated as discrete blocks in FIG. 3, it is to be understood that the blocks are merely illustrative and the functionality of each component may be implemented using software executing one or more computing devices, such as a series of servers located in different physical locations. The computing device 100 (also referred to as a user or customer computing device) is provided with one or more processors and memory configured to execute various software applications, including a support application 302 comprising a communication module 304, a control module 306, a character rendering module 305 and an avatar animation library 368.

The customer computing device 100 may include a Linux-based operating system, such as the Android operating system by Google, Inc., and the support application 302 may comprise a browser-based software application operating in the applications layer of the operating system. The communication module 304 may implement, for example, a protocol for browser-based real-time communication, such as WebRTC. The communication modules 304 (and more generally the support network 300 and computing device 100) enables real-time one-way or two-way media streaming between the browser-based support application 302 running on the user computing device 100 and the browser application 322 on the support agent computing device 150.

The term real-time, as used herein, refers to actions or operations that are done within a time frame associated with the transfer or exchange of audio and video content through modern conventional audio/video communications networks that operate utilizing a similar infrastructure and similar bandwidth constraints utilized with the methods and systems described herein. For example, a real-time audio exchange with a customer through a virtual character, in accordance with embodiments herein, refers to a voice exchange time frame associated with voice conversations over conventional telephone, cellular and/or voice or internet protocol (VOIP) network. Similarly, a real-time video presentation of virtual character animation with a customer, in accordance with embodiments herein, refers to a time frame associated with presentation of video over conventional video conferencing networks. As another example, an avatar based exchange, occurring in "real-time", refers to a time frame associated with presentation of audio content through a conventional telephone and/or VOIP network and associated with presentation of video content through a conventional video conferencing network, when conveyed over a similar infrastructure, experiencing similar data bandwidth constraints and the like. The term real-time includes, but is not limited to, simultaneously or at the same time as the customer and/or support agent are speaking or taking actions on the respective device. By way of example, real-time audio and/or video streaming shall include as instantaneously as possible, but where limited by factors such as the ability to receive data, the ability of the hardware/software to receive/access the data and perform the transformation, and the like.

When the user computing device 100 is running the Android operating system, the communication module 304 may utilize a WebView element to render the graphical content provided by the support network 300.

The central control module 310 may comprise a management application running on a computer server in the support network 300. The central control module 310 handles control and communication between a plurality of user computing devices and support agent computing devices, and other components of the support network 300. When a user launches the support application on a computing device (e.g., support application 302 on computing device 100), the support application 302 establishes a connection with the central control module 310 via a session control channel. The central control module 310 directs the support session control module 364 to initiate a new support session and transmits the session information to the agent dashboard server 320. The agent dashboard server 320, in turn, assigns the new support session to one of the support agent computing devices (e.g., support agent computing device 150). The central control module 310 stores information regarding all of the customer support sessions provided by the support network 300 in session database 336. The central control module 310 also maintains an agent control channel with the agent browser 322. The agent control channel may be used to transmit secondary graphics between the user computing device 100 and the agent computer device 150 and may also be used to transmit signal information to establish the media session between the user computing device 100 and the agent computing device 150.

The support session control module 364 handles audio, video, graphical and data transfer to and from the user computing device 100. The support session control module 364 may be implemented as a computer server implementing a Traversal Using Relays around NAT ("TURN") protocol for handling data over TCP and UDP connections. The graphical media streaming can include one or more of screen sharing graphics between the user computing device 100 and the agent computing device 150.

The PRS content management module 360 manages creation, storage, updates, selection and presentation of prerecorded support content. For example, the PRS content 354 may be created by recording one or more support agents, while conducting support sessions with users. The PRS content 354 is then stored in the support archive 318 along with a request for information 352 indicating when the PRS content 354 is to be used. For example, the requests for information 352 may be entered by a support agent, a network manager, or automatically based on information entered by customers during support sessions. For example, the requests for information 352 may be created based on automated data analysis techniques from CID information associated with a select or a common type of support session.

The PRS content management module 360 may update the collection of requests for information 352 and PRS content 354 throughout operation. For example, new incoming CID information 344 may not be identical to any of the stored requests for information 352, but the CID information 344 may represent a relatively close match to a select request for information. The CID information 344 may be designated to constitute a match, based on a degree of similarity, with a select request for information 352. In connection therewith, the PRS content management module 360 may update the request for information 352 based on the CID information 344.

When a support session is initiated, the PRS content management module 360 seeks to match incoming CID information 344 with one of the requests for information 352. The matching analysis may represent a text/word comparison analysis, a comparison between spoken terms and stored standardized terms, a comparison between a select product and/or feature/function and a collection of products and features/functions, as well as other matching techniques. The comparison may not yield an exact match. Instead, the comparison may return one or more potential matching candidate requests for information, each of which has an associated score or ranking indicating the degree of similarity or likelihood that a match has occurred. A match may be selected based on various criteria, such as the highest score/rank and the like. When the PRS content management module 360 identifies a matching request for information 352, the PRS content management module 360 selects the associated PRS content 354. The selected PRS content 354 is provided to the CDU conversion module 366 which operates as discussed herein.

The communication module 304 is configured to support communications with the support network 300, including but not limited to transmitting request for assistance 348, customer issue definition information, other information and data to the support network 300. The communication module also receives data and information from the support network 300 such as character definition and update data, virtual character voice audio data, secondary video data and other information displayed on or audibly output by the computing device 100.

The control module 306 controls operation of the computing device 100 as explained herein, such as in connection with initiating and maintaining avatar-based exchanges within support sessions.

The avatar animation library 368 stores all or a subset of the virtual character related information stored in the avatar animation library 368 (discussed herein). The virtual characters may represent two-dimensional or three-dimensional images of fictitious characters, 3-D or 3-D models based on support agents and the like. The avatar animation library 368 stores character definitions (e.g. gender, age, race) defining one or more virtual characters/avatars, as well as motion—related attributes indicative of changes in the virtual character to produce animation. The avatar animation library 368 also stores character attributes defining features of the character definitions (e.g. skin-tone, hair color, hairstyle, facial features, etc.). The character attributes may also define overall facial expressions associated with various emotions, such as concern, confusion, interest, happiness, frustration, satisfaction and the like. The motion related attributes define changes in character attributes, such as in connection with talking, changing facial expressions, moving the character's head, hands, arms legs and torso, and the like. For example, a first set of character attributes may represent a base character definition for a middle-aged bald male virtual character with a goatee and having a select skin-tone. The character attributes may further present the base virtual character with a smile. The motion related attributes may direct movement of the base virtual character's mouth when speaking, as well as movement of the base virtual character's head and shoulders to present animation while speaking and/or listening. By storing facial expressions and other information as character definitions, character attributes and motion related attributes in the animation library 368 on the computing device 100, embodiments herein helps save memory on the local device, save processing resources on the local device, saves data transmission resources.

The animation library 368 may be initially loaded with a predetermined level of virtual character information at the time of manufacture of the customer computing device 100, in order that the character rendering module 305 is able to perform basic virtual character animation and playback of virtual character voice audio data at the time when the customer computing device 100 is initially purchased. By providing the base level of virtual character information, the support network 300 is able to communicate with the computing device 100, when first purchased/activated, without requiring any additional downloads of virtual character definitions or character attributes.

Additionally or alternatively, the support network 300 may push additional virtual character (VC) definitions and attributes to the computing device 100 throughout operation. For example, it may be desirable to push additional VC definitions and attributes to the computing device 100, such as to add additional types of avatars, increase the amount of detail presented in the virtual character animation, add additional types of animation (e.g., new facial expressions), improve the degree to which the avatar appears realistic, or to otherwise generally improve or provide a higher fidelity support customer experience.

Additionally or alternatively, the avatar animation library 368 may store all or a portion of the collection of requests for information (RFI) and related pre-recorded support (PRS) content. For example, the collection of requests for information and PRS content is preloading or pre-pushing to the customer computing device 100, such as at the time of manufacture, activation or any time thereafter, but prior to the customer computing device generating a request for assistance 348 or initiating a support session. Once the customer computing device 100 is activated, when the customer initiates a request for assistance 348 and enters customer issue definition information, the control module 306 may seek to resolve the issue locally on the customer computing device 100 without needing to separately engage a support agent. The control module 306 does so by comparing the request for assistance and/or customer issue definition information with the preloaded/pre-pushed request for information and associated preloaded/pre-pushed PRS content. When a match is found, the associated matching PRS content is presented in combination with animation of the virtual character on the customer computing device 100.

An avatar-based exchange may or may not be initiated anyway with the support network 300. For example, when the pre-loaded/pre-pushed PRS content simply represents a greeting, closing or other standard non-resolution interaction, an avatar-based exchange may be launched in addition while the preloaded PRS content is being played to the customer. Alternatively, when the PRS content is more substantive and may represent a potential complete solution to a problem, optionally, the control module 306 may first present the PRS content to the customer to determine whether the problem may be solved locally. When the problem is unable to be solved locally, the control module may then pass the request for assistance and CID information to the support network 300.

In some embodiments, different computing devices 100 may be preloaded (or have pushed thereto) a collection of RH and associated PRS content. For example, the collection of RFI and PRS content for an individual computing device 100 may be determined based on a customer's profile, the type of product, the geographic location in which the customer is located or other bases that afford an indication that different types of issues/requests may arise for a particular customer computing device 100.

The character rendering module 305 manages operation and animation of the virtual character, and convert voice audio data within the PRS content to the virtual character voice audio data for the selected avatar. The collection of requests for information and PRS content may be updated periodically, such as when solutions to new common problems become available, as well as new solutions to existing problem, or more generally frequently asked questions.

The character rendering module 305 manages presentation and animation of virtual characters on the display of the computing device 100. The character rendering module 305 may also manage output of virtual character voice (VCV) audio data such as when a virtual character talks to the customer. The character rendering module 305 accesses the avatar animation library 368 to utilize the character definitions, character attributes and motion related attributes to create a rendering of a virtual character, as well as to animate movement and facial expressions of the virtual character, on the display of the computing device 100. The character rendering module 305 accesses the avatar animation library 368 based on character definition and update (CDU) data received from the support network 300 during a support session. For example, the character definition and update data may provide an initial designation of the character attribute set to be utilized to define the base virtual character. Subsequent character definition and update data is provided from the support network 300 throughout a support session in connection with animation of the virtual character. During the support session, the CDU data may include, or be transmitted separate from, the virtual character voice audio data. The VCV audio data is output in coordination with animation of the virtual character.

The support network 300 includes one or more support agent computing device 150, a central control module 310, an agent dashboard server 320, a support archive 318, a prerecorded support (PRS) content management module 360, a session control module 364, a CDU conversion module 366 and an avatar animation library 368.

The support network 300 represents a computer system that comprises one or more processors; and memory having stored therein instructions that, when executed by the computer system, cause the computer system to operate as follows. The support network 300 receives, from the computing device 100, a request for assistance that can be satisfied by one of a plurality of support agents.

The support archive 318 comprises a storage system that can be used to store all of the media exchanged during a customer support session between the customer computing device 100 and agent computing device 150. The support archive 318 stores a collection of requests for information 352 and related pre-recorded support (PRS) content 354. The PRS content 354 relate to select issues or topics. By way of example, the PRS content 354 for a particular issue may include audio/video clips recorded while a support agent reads or presents scripted content. The PRS content 354 for the particular issue may include prerecorded voice audio data and/or prerecorded video data. The prerecorded voice audio data and video data may represent an audio/video recording directly of a support agent. Alternatively, the prerecorded voice audio data may represent virtual character voice audio data that has been created by converting a voice recording of a support agent. Alternatively, the prerecorded video data may represent virtual character animation data that has been created by converting a video recording of a support agent.

The PRS content 354 may relate to various topics. For example, the PRS content 354 may include greetings, questions, step by step explanations for trouble shooting problems, a classroom lecture, directions regarding how to assemble a product, and the like. The PRS content 354 may include a common greeting that is presented at contact initiation with a user by a graphical avatar. Additionally or alternatively, the PRS content 354 may include "pre-canned answers" to common problems which, as one example, in the past may have been read by a support agent to a customer. The PRS content 354 may include a demonstration of a common problem resolution or appliance feature.

Additionally or alternatively, the support archive 318 may store a library of common solutions 355 that includes pre-selected answers or solutions to common problems. The library of common solutions 355 may correspond to all or a portion of the PRS content 354, or may represent independent and distinct data files. During operation, the CSA computing device 150 may present all or subsets of the library of common solutions 355 to the support agent and enable the support agent to select one or more common solutions to be presented back to the customer as PRS content. While PRS content is presented to the customer, the customer may interrupt the playback to ask questions or to otherwise engage the support agent.

The stored media may be used for training and audit purposes, such as to review the performance of the various customer service agents in the support network 300. The stored media exchanged may also be used to create request for information 352 and corresponding PRS content 354. In accordance with some embodiments, the support session may be made available to the user and/or support agents in training so that the user and/or support agent in training may review a recording of a previously-held customer support session. This can be helpful to users who wish to review the instructions provided by the customer service agent. In some embodiments, after a customer service session is completed, the stored session data, including one or more of the audio, video, screen sharing, and graphical elements from the agent, may be transmitted to the user's cloud storage server 324, for later retrieval and playback by the user. The stored session data may be stored as a video file that can be played back and viewed by the user exactly as the user had experienced it live during the customer service session.

The support agent computing device 150 includes one or more processors and memory configured to execute various software applications, including a web browser application 322. The support agent computing device 150 may also include a voice communication module 323, which may include a voice communications headset or other microphone and speaker hardware, and corresponding software for handling voice communications between the support agent computing device 150 and the computing device 100. The voice communication module 323 records and digitizes the support agent's speech into support agent voice (SAV) audio data 367 that is passed to the CDU conversion module 366. The support agent computing device 150 affords the support agent the ability to control the support session. The support agent computing device 150 enables the support agent to reference additional information, such as to look-up standard answers, instructions and the like regarding common issues. The answers, instructions and the like may be read by or sent from the support agent. The support agent computing device 150 provides various other types of functionality to the support agent in connection with customer support.

The CDU conversion module 366 converts the SAV audio data 367 into virtual character voice (VCV) audio data 370 which is passed to the computing device 100 for audio playback. Optionally, the SAV audio data 367 may be passed through the avatar-based exchange 350 to the computing device 100, where the character rendering module 305 converts the SAV audio data 367 into VCV audio data to be played to the customer. In the foregoing manner, the support network 300 provides audio content through the voice of the virtual character consistently throughout a support session, regardless of whether the audio content originated as pre-recorded content, or was created real time by one or multiple support agents.

Optionally, in some situations, the SAV audio data 367 may never be converted to VCV audio data, and instead the SAV audio data 367 may be passed directly through the avatar-based exchange 350 to the computing device 100, where the SAV audio data 367 is played back to the customer in the voice of the support agent (e.g., in a non-VC spoken voice).

The support agent computing device 150 may also include a feature detection module 321 that is configured to sense facial features and changes in facial features of the support agent during a support session. For example, the feature detection module 321 may employ a digital motion capture device to capture facial expressions and movement of the support agent's face. For example, the feature detection module 321 may include a camera (such as built into most smart phones, computers and tablet devices). The camera may record still images or video of the support agent during a support session, where the images or video are analyzed by the feature detection module 321 real time (during the support session) to identify expression attributes of interest. For example, the feature detection module 321 may utilize various image analysis and/or facial recognition techniques, such as to identify the position and orientation of the support agent's face and facial features. By way of example only, the feature detection module 321 may utilize the facial recognition techniques described in U.S. Pat. No. 8,897,510, entitled "Enhanced Face Recognition in Video", issued Nov. 25, 2014, the complete subject matter of which is incorporated herein by reference in its entirety.

Optionally, the feature detection module 321 may communicate with one or more sensors placed on or near the support agent's face (e.g. markers placed on glasses, a headset or otherwise). As the support agent talks with a customer, the sensors move in relation to one another and/or in relation to a reference coordinate system. The sensors may return location signals indicative of the absolute or relative positions of the sensors (e.g. with respect to one another and/or with respect to a reference coordinate system). The feature detection module 321 analyzes the location signals to identify movement of the support agents, from which the feature detection module 321 calculates changes in expression attributes of interest.

For example, expression attributes of interest may represent movements of the support agent's mouth while talking, movement of the support agent's jaw, eyebrows, head position, head tilt and orientation, and the like. The feature detection module 321 provides values for the expression attributes of interest to the central control module 310, support session control module 364 and/or CDU conversion module 366 to be further processed as explained hereafter in connection with voice playback and animation of the virtual character at the customer computing device 100.

The support session control module 364 opens a support session with the computing device 100, and launches an avatar-based exchange 350, during the support session. The support session control module 364 provides information to the CDU conversion module 366 to enable selection of the virtual character to be utilized during the support session. For example, the support session control module 364 may provide a customer profile, a product identifier, and/or information regarding which support agent may be utilized.

The CDU conversion module 366 selects a virtual character from the avatar animation library 368 to be utilized during the support session. The selected virtual character is defined by a character definition comprising a set of character attributes chosen by the CDU conversion module 366. The virtual character may be chosen based on the customer profile, the type of product or nature of the issue with which the customer seeks assistance, the support agent expected to be used and the like. The virtual character may also be chosen based on an individual associated with a particular brand (e.g. a virtual model of a professional athlete, celebrity, company founder, etc.). Optionally, when particular support agents are used to create virtual character voice audio data and the CDU conversion module 366 knows which support agent to use, that support agent's pre-existing virtual character voice audio data may be used with the character definition. Optionally, when particular support agents are used to create virtual character animation data (e.g., character attributes, motion related attributes, etc.) and the CDU conversion module 366 knows which support agent to use, that support agents pre-existing virtual character animation data may be used with the character definition.

Optionally, the CDU conversion module 366 may select the virtual character (VC) spoken voice to be used when generating the VCV audio data and playing back the VCV audio data over the computing device 100. The virtual character spoken voice may be selected by the customer, by the system manager, by a support agent or automatically based on various criteria. For example, the CDU conversion module 366 may select the virtual character spoken voice selected based on i) the type or nature of the virtual character selected, ii) the type or nature of the request for assistance and/or the CID information, iii) the customer profile, iv) the support agent selected (or potentially selected), and the like.

For example, the CDU conversion module 366 may select the virtual character, background image (e.g., what is behind the avatar) and VC spoken voice based on information known about the customer. For example, when the customer is using a tablet to read a book, the CDU conversion module 366 may selected an avatar representing a character from the book. The avatar may be chosen based on indications received from the customer about which characters the customer likes from the book. The avatar may be chosen by reviewing passages from the book that have been highlighted in an electronic book by the customer, based on comments the customer has made on social network sites, etc. As a further example, when a customer is using a FireTV device to watch a movie or television show, the avatar may be selected to represent a popular character from the TV show/movie they are watching. The CDU conversion module 366 may select the avatar based on the nature of the problem. For example, when watching educational videos on AIV and the customer needs help with a technical issue, the customer support avatar be a rendering of Neil deGrasse Tyson (narrator of Cosmos). If the customer is playing games with FireTV or watching game videos in Twitch, the avatar may be selected based on a character in the game. Embodiments may also look at purchase history on Amazon.com. For example, when the customer has recently bought a bunch of baby supplies, the avatar may be picked to looks like a parent or teacher, or when the customer has recently bought a bunch of musical instrument related accessories, the avatar may be selected a musical artist as the avatar. Embodiments may also look at the social network (with consent) and select the avatar based on trends gleaned from the customer's social media history. For example, when someone seems to provide helpful post on the social network about how equipment/devices work, embodiments may choose a rendering of the social network contact to help explain how to connect WiFi; or if a nontechnical parent is calling in for help, embodiments may pick images of the parent's tech savvy child as the avatar rendering.

In some embodiments, the methods and systems provided herein may be maintained by a service provider that provides groups or "banks" of support agents for various products from multiple sources (e.g, outdoor camping gear, electronic games, computing devices, toys, lawn equipment, etc.). Different product manufactures (or product distributors) may have preferences on the types of virtual characters and VC spoken voices to be presented to customers in connection with servicing particular products. For example, companies that manufacture, distribute, and/or sell outdoor camping gear may desire the virtual character to have an "outdoor appearance" and a corresponding VC spoken voice (e.g., with a western accent, etc.). Companies that manufacture, distribute, and/or sell electronic gaming products may desire the virtual character to have a "youthful appearance" and a corresponding VC spoken voice (e.g., a teenage boy/girl). Companies that manufacture, distribute, and/or sell products that are marketed with a strong brand presence or spokesperson (e.g., associated with a celebrity or professional athlete) may desire the virtual character and the VC spoken voice of the virtual character to correspond to the spokesperson for the product. The CDU conversion module 366 accounts for company preferences when selecting the virtual character and VC spoken voice to be used when generating CDU data and VCV audio data.

As part of the avatar-based exchange 350, the support session control module 364 receives customer issue definition (CID) information 344 from the computing device 100 regarding the request for assistance. The CID information 344 is entered by the customer to explain or define the issue, with which the customer seeks assistance. The PRS content management module 360 chooses the pre-recorded support content 354 based on the CID information 344 received from the computing device 100. The PRS content management module 360 provides pre-recorded support content 354 (audio and/or animation) to be presented through the animated avatar. Optionally, the CDU conversion module 366 may generate CDU data 345 based on the PRS content 354 to animate the graphical avatar presented on the computing device 100.

The avatar animation library 368 stores a collection of virtual characters (avatars) defined by sets of character attributes. Examples of character attributes include hairstyle, color, length, skin tone, facial hair, facial features such as eye, nose and mouth shape, position and spacing, and the like. The avatar animation library 368 also stores character update data representative of changes in character attributes, such as representative of changes in the shape of the mouth, movement of the jaw and the like, indicative of the words being spoken. The avatar animation library 368 also stores the character attributes in connection with different facial expressions, such as a look of interest, concern, confusion, frustration, concentration, smile and the like.

The character attributes may also include glasses, a headset, and other accessories. Sets of character attributes define one or more base virtual characters. The character attributes may also define themes related to the characters, in order that a base character having a select theme may be chosen (e.g., based upon a profile for the customer requesting assistance). Optionally, a select theme may be chosen based upon the type of product or nature of the assistance being requested. For example, when a customer requests assistance in connection with assembling a tent, the theme for the base character may have an outdoors appearance, such as wearing clothing and other apparel one would expect to wear when camping. As another example, when the profile for the customer indicates a certain age, gender or other demographic characteristic of the customer, the theme of the base character may be chosen appropriately. For example, customers with certain profiles may prefer support agent characters/avatars that are male or female, within a select age, or have other particular demographic characteristics. As another example, the character definition or theme may be selected to represent a brand of product, such as a virtual character representing a well-known person associated with the brand (e.g. a professional athlete when the request concerns sporting clothes and accessories, an owner/founder of a company when the request concerns initiating, installing, or servicing products sold by the company).

Optionally, the character and motion attributes may also define hand, arm and leg movement and/or gestures to support animation of the upper torso and/or entire body of the virtual character. For example, the request for assistance may relate to assembling a system, performing an exercise, performing a dance, performing a youth related sports drill, playing an instrument, how to start or operate a product (e.g. a lawnmower, leaf blower) and the like. By providing character attributes in connection with the hands, arms, legs, etc., embodiments are provided that support demonstration of equipment, actions, and the like.

Additionally or alternatively, the avatar animation library 368 (and/or the support archive 318) may store prerecorded sequences of virtual character animation in connection with prerecorded support content 354 and common solutions 355 (when separate). When prerecorded virtual character animation is stored in the archive 318, the animation may be streamed, along with the prerecorded support content 354, to the computing device 110. Optionally, prerecorded virtual character animation may be included as part of the prerecorded support content 354. For example, the prerecorded support content 354 may include recorded voice audio data in combination with a prerecorded sequence of the virtual character animation.

Optionally, the avatar animation library 368 in the computing device 100 may include all or a subset of the character definitions, character attributes and motion related attributes stored in the avatar animation library 368. As one example, when a support session is initiated a subset of the character definitions, attributes, etc. may be pushed from the avatar animation library 368 at the support network 300 to the avatar animation library 368 at the customer computing device 100.

In some embodiments, the support network 300 may convey a limited amount of CDU (character definition and update) data to the computing device 100 in connection with setting up and maintaining animation of the virtual character. The CDU data defines a virtual character and manages animation thereof. The character rendering module 305 at the computing device 100 creates and animates the virtual character based on limited CDU data 345 received. By conveying a limited amount of CDU data 345 to the computing device 100 during a support session, the support network 300 utilizes very low or limited bandwidth in connection with presenting an animated virtual character. As non-limiting examples, the CDU data 345 may utilize 5-15 baud, or approximately 6 baud of bandwidth to convey CDU data 345 representative of virtual character animation.

In the foregoing embodiment, the computing device 100 performs rendering and animation of the virtual character. In other embodiments, the support network 300 may perform rendering of the virtual character, as well as some or all animation operations, and stream detailed animated character/avatar data to the computing device 100 to be directly displayed on the display of the computing device 100. In this example, limited or no additional graphical processing or rendering is performed at the computing device 100. Streaming detailed animated character data may be desirable when the computing device 100 has limited processing power and functionality. Streaming detailed animation character/avatar data may utilize a somewhat larger amount of bandwidth. Accordingly, when supporting customers have access to limited bandwidth, it may be preferred to convey the CDU data 345 to the computing device 100 such that the computing device 100 performs local rendering and animation of the virtual character.

The CDU data 345 is generated by the CDU conversion module 366. The CDU conversion module 366 receives PRS content 354 and/or support agent content 346 throughout a support session. The CDU conversion module 366 converts prerecorded voice audio data (from PRS content 354) and/or support agent voice audio data (from support agent content 346) into virtual character voice audio data. The CDU conversion module 366 also converts prerecorded video data (when present in PRS content 354) and/or support agent feature data (e.g., facial features) into virtual character animation data, which represent part of the CDU data 345. For example, the virtual character animation data may simply represent updates to character attributes of the previously defined avatar. The virtual character voice audio data and virtual character animation data are passed to the computing device 100 as CDU data 345.

Optionally, during set up, the CDU conversion module 366 may be used to create a virtual character definition, such as by defining a corresponding set of character attributes to be saved in the avatar animation library 368. When creating a virtual character definition, the customer support agent computing device 150 may be placed in a character definition mode. When in the character definition mode, the support agent places markers/sensors on the support agent's face and reads through one or more scripted responses. Optionally, the markers/sensors may be omitted when facial recognition software is used to analyze still images or video captured by a camera at the computing device 100. The support agent may also step through various facial expressions, such as intent listening, concentration (e.g. on a customer while the customer is speaking), a smile (e.g. of satisfaction when a successful result occurs), frustration (e.g. when a proposed solution is not successful), and the like. The feature detection module 321 monitors the sensors/markers on the support agent's face (or performs image analysis to identify facial features) and provides corresponding support agent feature data to the CDU conversion module 366. The CDU conversion module 366 processes the support agent feature data to form a corresponding set of character attributes, as well as motion related attributes while the support agent changes facial expressions. The set of character attributes and motion related attributes are saved in the avatar animation library 368.

Optionally, the CDU conversion module 366 and feature detection module 321 be utilized when generating prerecorded support content, such as the PRS content 354 stored in the support archive 318. To generate PRS content 354, a support agent may read through a scripted response to a request for information, while the feature detection module 321 collects position signals from sensors on the agent's face (or performs image analysis of facial features) and the CDU conversion module 366 generates character definitions, character attributes and motion related attributes from the position signals. Optionally, the PRS content 354 may be recorded while a support agent is engaged in an actual support session. As a further option, the CDU conversion module 366 may not create character or motion related attributes in connection with individual PRS content 354. Instead, the PRS content 354 may be generated based primarily or solely on the verbal speech from the support agent, without associating any specific character definitions or attributes with specific PRS content 354.

During a support session, in some embodiments, the CDU conversion module 366 monitors the PRS content 354 that is provided to the computing device 100 and provides corresponding CDU data 345 based on the PRS content 354. For example, the CDU data 345 may correspond to changes in the mouth and movement of the virtual characters jaw and face, based on the spoken words of the PRS content 354. The CDU conversion module 366 may also output CDU data 345 indicative of particular facial expression and changes in the facial expression based on feedback from the customer within the customer issue definition information. For example, when the CID information indicates that the customer took an action that was successful to solve a problem, the CDU conversion module 366 may convey CDU data 345 indicative of a smile in the virtual character's facial expression. Similarly, when the CID information indicates that the customer's actions were not successful to solve a problem, the CDU conversion module 366 may convey CDU data 345 indicative of a frown, frustration and the like to be conveyed in the virtual character's facial expression.

Optionally, when PRS content 354 is played back to a customer during a support session, the CDU conversion module 366 may select generic or pre-existing character definitions and attributes to be conveyed to the computing device 100 in connection with the PRS content 354.

When a support session transitions from prerecorded support content to a human support agent-based content, the CDU conversion module 366 continues to provide consistent and seamless CDU data 345 to the computing device 100. For example, the CDU data 345 indicating changes to the virtual character that are provided based on support agent feature data remains the same as or at least consistent with CDU data 345 provided based on PRS content. Hence, even though the CDU data 345 provided while a human support agent is speaking may be based on the content of the speech from the support agent, the CDU data 345 continues to animate the virtual character consistent with prior animation. Further, the CDU conversion module 366 may produce CDU data 345 based on information from the feature detection module 321 (e.g. based on the sensor signals, based on image analysis performed at the feature detection module 321 and the like), but the CDU data 345 is consistent with prior animation.

In some embodiments, when a support session is initiated, the support session control module 364 may provide a customer profile, product information, issue type information and the like to the CDU conversion module 366 in connection with determining an appropriate theme for the virtual character. The CDU conversion module 366 accesses the avatar animation library 368 to obtain a select virtual character or avatar based on various criteria, such as the customer seeking assistance, the support agent selected, the nature of the product or function with which assistance is being sought and the like.

The agent dashboard server 320 monitors activity on a plurality of the support agent devices 150 and selects a support agent from the plurality of support agent computing devices 150. The support session control module 364 transitions the avatar-based exchange from the pre-recorded support content 342 to support agent responses 346 to be communicated through animation of the virtual character at the computing device 100. When a human support agent becomes available, the support session continues to present the virtual character or avatar through the session interface to the customer, such that the customer never experiences/notices a change in the nature of the audio/animation being provided as support.

Figure 4A:
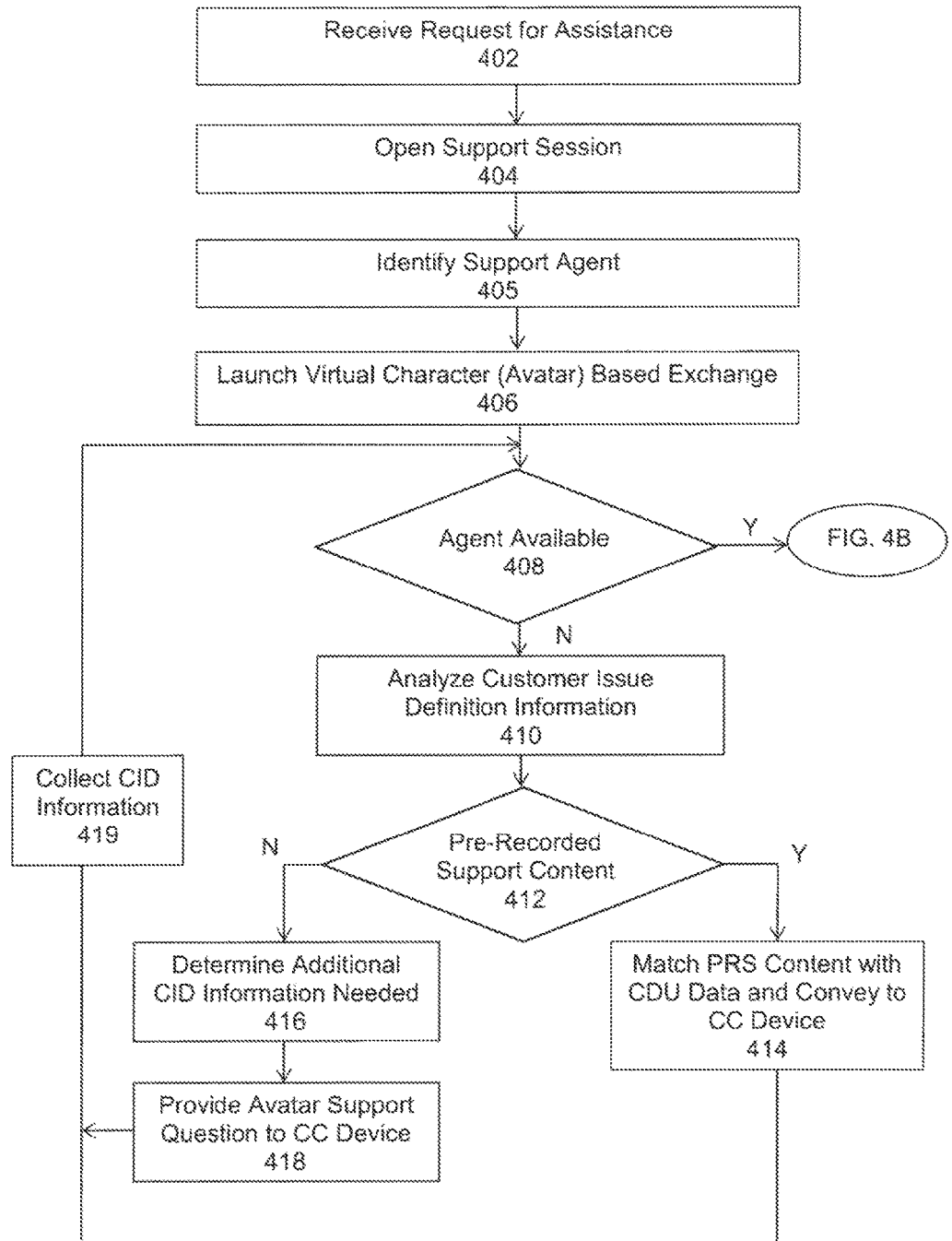
FIGS. 4A-4C are a flowchart illustrating a method of providing remote support in accordance with embodiments herein.
Figure 4B:
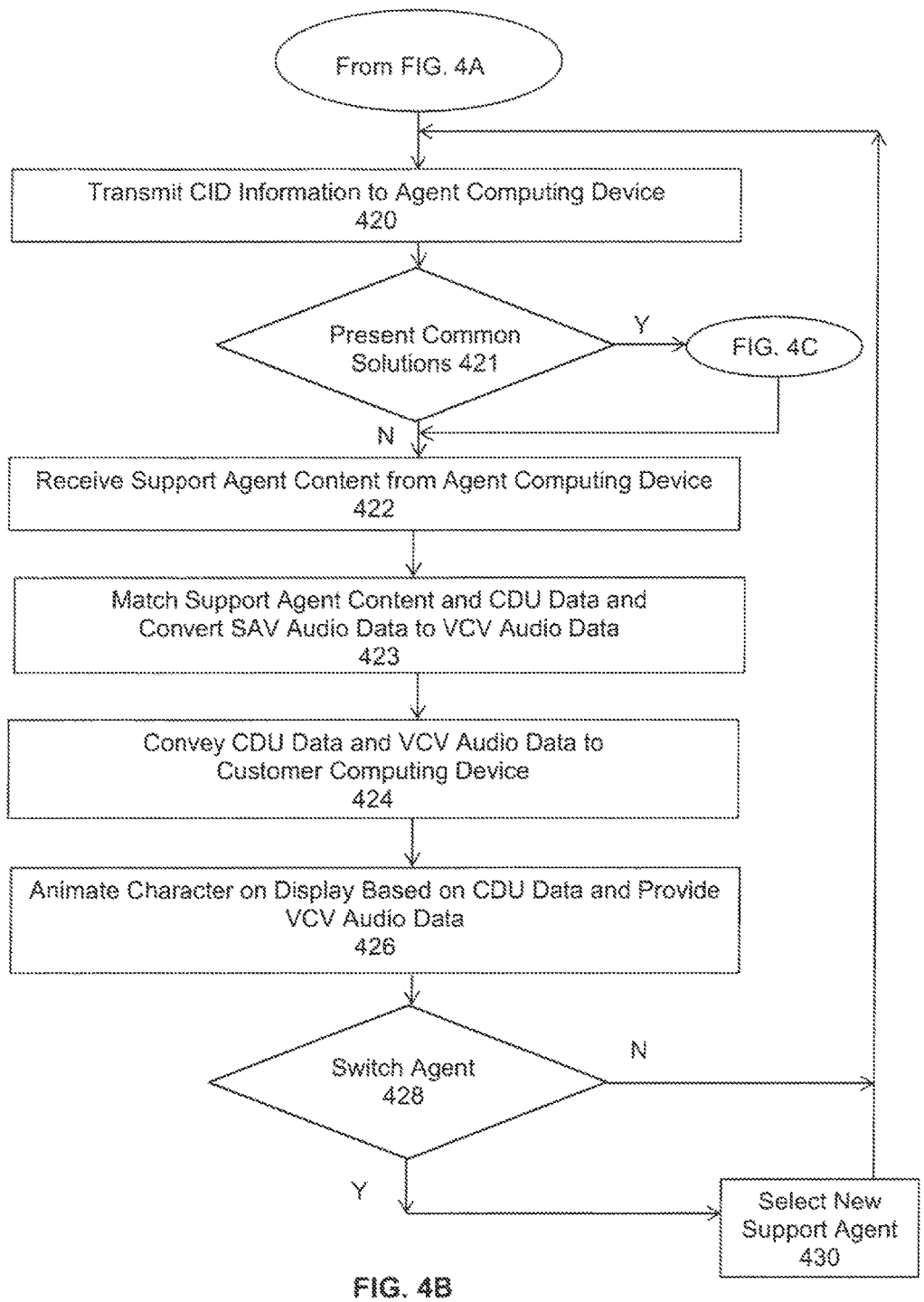
Figure 4C:
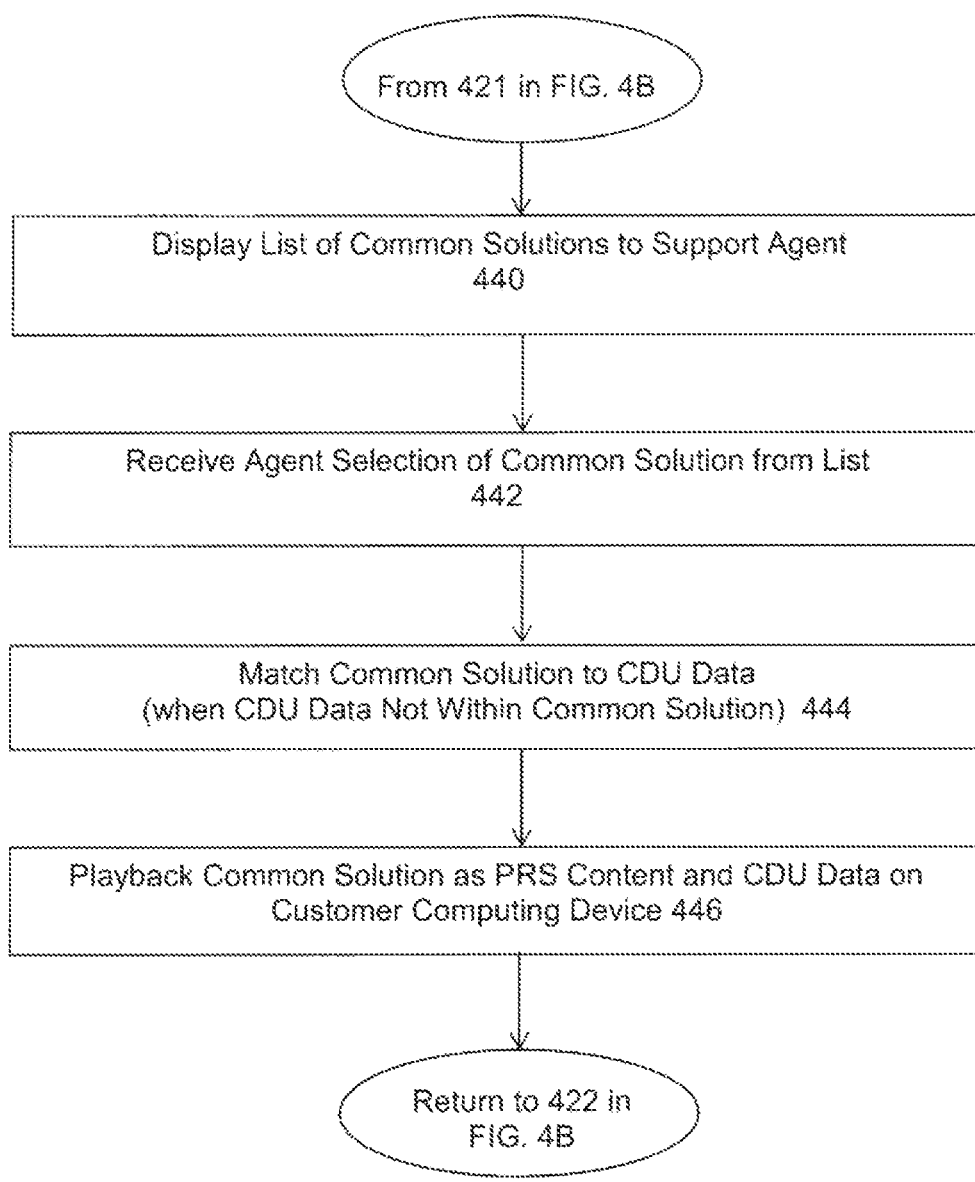

FIGS. 4A-4C are a flowchart illustrating a method of providing remote support in accordance with embodiments herein. Flow diagrams of example processes are now described to facilitate entry and review of component level ratings in connection with discrete components of an item. Each process is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 402, the process receives, from a computing device 100, a request for assistance fulfillable by one of a plurality of user support agents. The request for assistance may include CID information such as, but not limited to, identification of the customer, identification of the nature of the problem/issue, and the like. When the request for assistance relates to a feature on a product, the CID information would identify the type of product (optionally the serial number) in addition to the nature of the problem/issue. Optionally, the request for assistance may represent a request for instructions to assemble or operate a product.

At 404, the process opens a support session with the CC device 100. For example, the control module 364 may establish a bidirectional channel or link with the computing device 100, over which audio information may be transferred bidirectionally (e.g. to and from the customer) and over which video information may be transferred unidirectionally to the customer. In general, the support session may not convey video information, such as captured by a camera at the customer computing device 100, to the support network 300. Optionally, the customer may be presented with an option to enable bidirectional video transfer. The control module 364 may also provide to the agent dashboard server 320 information that may be of interest in connection with choosing a support agent. For example, the control module 364 may provide customer profile information that may be useful in selecting a similar support agent. As another option, the control module 364 may provide a product identification or other information indicative of a nature of the request for assistance that may be useful in selecting an appropriate support agent.

At 405, the process identifies a support agent that is available to provide support to the user. For example, the agent dashboard server 320 may select a support agent from a plurality of support agents based agent availability. Optionally, the support agent may be selected based on the customer issue definition information or more generally the request for assistance, such as based on a customer profile, product type, nature of the problem and the like.

At 406, the process launches an avatar-based exchange, during the support session, with the computing device 100. For example, the control module 364 conveys an agent interface element 120 (FIG. 1). The interface element 120 includes a virtual character animation portion 126 that displays the animated virtual character or avatar 125. The virtual character 125 is produced by the character rendering module 305 based on CDU data 345 received.

At 408, the process determines whether a support agent is available to enter the support session and communicate with the user. When a support agent is available, flow branches to 420 in FIG. 4B, where the avatar based exchange transitions to be agent guided. When a support agent is not available at 408, flow moves to 410, where the avatar based exchange is guided or based on PRS content.

At 410, the process receives and analyzes customer issue definition information 344 (FIG. 3) from the computing device 100. The customer issue definition information 344 describes the nature of the problem that the customer is experiencing or the type of support that the customer desires. The PRS content management module 360 compares the CID information 344 with the requests for information 352 stored in the support archive 318 and seeks to identify a matching request for information 352. When the CID information 344 matches a request for information 352, the PRS content management module 360 determines that PRS content 354 has been previously saved that is potentially or at least partially responsive to the customer's request for assistance. For example, the PRS content management module 360 may access a collection of predetermined requests for information 352 stored in the support archive 318. Each request for information 352 has a corresponding common solution 354. The PRS content management module 360 matches the incoming CID information 344 to one of the predetermined requests for information 352, and providing the common solution 354 corresponding to the matching of the predetermined requests for information as responsive pre-recorded support content 342. Additionally or alternatively, the PRS content management module 360 may simply determine that the customer issue definition information 344 concerns a particular type of product and/or a particular feature/function of a product. In response thereto, the PRS content management module 360 may access one or more pre-recorded support content segments to be presented on the US device 100.

At 412, when pre-recorded support content 354 has been stored in connection with a request for information 352 that at least partially matches the customer issue definition information, flow branches to 414. When pre-recorded support content 354 is not available at 412, flow branches to 416.

At 416, the process attempts to determine why no pre-recorded support content was identified at 412. For example, the CID information 344 may be incomplete (e.g., the user did not fully or accurately identify the product or function/feature at issue). When the CID information 344 is incomplete, at 416 the process identifies additional CID information that would be helpful or is needed from the user. The process constructs a question, comment or other feedback designed to inform the user regarding additional CID information that is needed or of interest.

At 418, the process provides an audio message such as a support question to the computing device 100. The audio message/question is spoken utilizing virtual character voice audio data corresponding to the virtual character (e.g. a select language, accent, tone, etc.). The VCV audio data is spoken in the voice of the avatar. Optionally, the CDU conversion module 366 may review the question, comment or other feedback generated at 416 and based thereon provide corresponding CDU data 345. When CDU data 345 is conveyed with an audio message/question, the VCV audio data 370 is presented in combination with graphical animations of the virtual character's facial expressions. Additionally or alternatively, the audio message/question and CDU data may be combined with secondary video content configured to inform or assist the user in determining additional customer issue definition information. For example, when a serial number or other unique identification information is needed from an electronic device, software application, etc., the secondary video content may represent as a graphical illustration of where to find the serial number or of one or more operations to be taken on a device to locate a serial number for a software package.

Returning to 412, when pre-recorded support content is identified to be available, flow moves to 414. At 414, the PRS content management module 360 outputs the matching pre-recorded support content 354. The CDU conversion module 366 converts the PRS content 354 to VCV audio data, such as having a select dialect, accent, etc. associated with the virtual character. The CDU conversion module 366 also generates CDU data associated with the PRS content and provide the CDU data and VCV audio data to the computing device 100. For example, the pre-recorded support content may include audio-visual (AV) content presented by the virtual character as avatar animation content. The pre-recorded support content may include a common solution to be presented by the graphical avatar, the common solution responsive to the request for information.

After the virtual character animation content is presented on the computing device 100, flow moves to 419 where additional CID information is collected. For example, the user may answer one or more questions, or otherwise enter additional information.

Next, flow returns to 408, where the process checks again to determine whether a support agent is now available. The operations of 408-419 are repeated until a support agent becomes available and is selected to assist the user. Thereafter, the process transitions the avatar-based exchange from a PRS content driven exchange to a support agent driven avatar-based exchange in which the support agent's responses are communicated through animation of the virtual character at the computing device 100. By way of example, the animation of the virtual character's facial expressions may be based on changes in facial expressions of the support agent. As another example, audible communications from the support agent are presented as VCV audio data through the virtual character on the computing device 100.

The transition represents a seamless cutover in which a basis for the animation of the avatar is changed from the pre-recorded support content to the support agent. The basis for the speech and the animated facial expressions changes from PRS content to speech (and optionally facial expressions) of the support agent. The operations described hereafter are illustrated in a serial process. However, it is understood that the operations may be performed in other orders and represent an interactive exchange between the user and the support agent, very similar to a face-to-face dialogue.

Next, the discussion is with reference to FIG. 4B, which illustrates the process performed in connection with maintaining a support agent driven or guided avatar-based exchange. At 420, the CID information is transmitted to the support agent computing device that is assigned to the customer. It is recognized that the CID information is transmitted to the support agent computing device before transition from the PRS content driven exchange, in order to provide the support agent with time to review the CID information and the PRS content presented thus far. Optionally, the support agent may be provided with "transition control" at the support agent computing device 150. When a transition control is provided, the selection of the transition control may be utilized at 408 (FIG. 4A) as a determining factor to transition to a support agent driven avatar-based exchange.

The support agent reviews the CID information and determines an appropriate response. For example, the support agent may need additional information. Alternatively, the CID information may be sufficient to describe a problem or question for which the support agent may have a full or partial solution or response.

At 421, the method determines whether the support agent desires to present a common solution to the customer. If so, flow branches to FIG. 4C. Otherwise, flow moves to 422.

At 422, support agent content is received from the agent computing device 150. The support agent content may be limited to speech content, such as a message or instructions for the customer. Optionally, the support agent content may include graphical animations such as facial expressions of the agent to be presented in the virtual character. Additionally or alternatively, the support agent content may include secondary video illustrating operation of products and/or features/functions. As noted herein, the support agent may be presented with a library of common solutions 355 during a support session. The support agent may select one or more common solutions to be presented back to the customer as PRS content. While PRS content is presented to the customer, the customer may interrupt the playback to ask questions or to otherwise engage the support agent.

At 423, the support agent content is converted to virtual character audio-visual content. For example, the support agent content may be converted to VCV audio data and CDU data indicative of virtual character animations. The CDU conversion module 366 may provide CDU data to animate the virtual character in a generic manner without specific input regarding the actual facial expressions of the support agent and without regard for the VCV audio data. Optionally, the CDU conversion module 366 may provide CDU data to animated the virtual character based on the speech content (VCV audio data), but still independent of the actual facial expression of the support agent. In the foregoing manner, the CDU conversion module 366 maintains animation of the virtual character or avatar, even when no actual facial expression information is received from the support agent, in order to enhance the customer experience. As one example, the CDU data may define changes to the character attributes that resemble character attribute changes utilized in connection with PRS content, thereby maintaining consistent behavior by the virtual character even after transition to support agent guidance.

At 424, the CDU data and VCV audio data is provided to the computing device 100. At 426, the character rendering module 305 converts the CDU data to a virtual character animation. The computing device 100 audibly presents the VCV audio data and displays the virtual character animation.

At 428, the process determines whether the support agent should be changed for the present support session. For example, a present support agent may enter an indication that a new support agent should be assigned to the present support session. When a change is desired, the support agent enters an agent change request at the CSA computing device 150. An agent change may be requested for various reasons. For example, the present support agent's shift may end, the present support agent may no longer have sufficient knowledge regarding the issue to provide assistance, the present support agent may be required in connection with a different support session, and the like.

At 430, a new support agent is selected from the available support agents. As one example, the present support agent may identify a particular support agent that is suited for the present issues or based on the customer's nature. Additionally or alternatively, the process may simply identify the next available support agent and assign the present session thereto. Additionally or alternatively, the change in support agent at 428 and 430 may occur based on feedback or a request from the customer. For example, the customer may be dissatisfied with the present support agent for various reasons. When the customer desires a different agent, the customer may enter a new agent request at 428, which is processed at 430. When a customer requests a new agent, the process may continue utilizing the same virtual character definition as presently being utilized. Alternatively, upon receiving a new agent request from a customer, the process may identify a new virtual character definition, as well as a new support agent. For example, flow may revert to 405 in FIG. 4A, at which a new support agent is identified, followed by the launch of a new avatar-based exchange. The present support session may be maintained, but with a new virtual character.

Additionally or alternatively, the customer may request a new virtual character definition, but be willing to continue communicating with the current support agent. For example, the customer may not like some aspect of the virtual character (e.g. the appearance, access, dialect). As an example, a young customer may not like an adult avatar, and instead request a child or cartoon character as the avatar. As another example, a female customer may wish for a male or may wish for a female avatar. Upon receiving the request for a new virtual character, the process reviews the available virtual character definitions (e.g. in the avatar animation library 368 in FIG. 3). The process may present multiple option to the customer from which the customer may choose. Alternatively, the process may select a candidate virtual character and continue the present support session with the newly selected virtual character.

In embodiments described above, remote support of a user computing device 100 is provided by a customer support network 300. This network 300 may be provided, for example, by the manufacturer or retailer of the device 100 or of software operating on the device. In accordance with other embodiments, support of a user computing device may be provided by another remote user. The remote user may operate a remote user computing device that may establish a support session directly with the user computing device 100 over a network, or the support session may be coordinated by the central control module 310. The remote user at the remote user computing device may be provided with the same or similar software or functionality described above with respect to the customer support agent computing device 150 and support network 300.

In other embodiments, the support software may be incorporated into a third party software application. The third party software application may include code for initiating a support session between the user computing device 100 and the customer support network 300 that may be operated by a company different from the third party software application developer. In this way the customer support network 300 and associated functionality described herein may be utilized by many different companies to provide enhanced customer support experiences.

Other embodiments may be used in environments other than the customer support examples provided above. For example, some embodiments may be used for instructional purposes, such as a classroom or online learning environment. The teacher may utilize a support application with similar functionality as the customer support application described above, for interacting with a student's computing device. In some embodiments, the support application may provide the ability to interact with multiple computing devices, such as all of the computing devices used by a group of students in a class (e.g., a single physical classroom containing all of the students, or a virtual classroom with students physically located in different locations). The support application may enable the teacher to transmit graphical elements and/or share the teacher's screen with the students, and may further enable the teacher to select a screen sharing session with one of those students to view the content on that particular student's computing device.

FIG. 4C illustrates a process performed in accordance with embodiments for enabling a support agent to select and play back prerecorded support content even after the avatar-based exchange has transitioned to guided based on support agent content. At 440, the process displays all or a subset of the list of common solutions 355 to the support agent on the CSA computing device 150. The common solutions that are displayed may be based on the CID information provided from the customer and/or information entered by the support agent. At 442, the process receives a selection from the support agent regarding one or more of the common solutions 355. The one or more common solutions 355 may represent PRS content 354.

At 444, CDU data is matched to the chosen common solution (when the common solution does not include a prerecorded sequence of virtual character animations). Optionally, the chosen common solution 355 may include a prerecorded sequence of virtual character animations therein, in which case there is no need to match CDU data with the common solution. The common solution 355 and CDU data are passed to the customer computing device 100. At 446, the chosen common solution and CDU data are played back to the customer on the computing device 100. While the common solution and related virtual character animation are being played, the support agent may choose to "multitask" to perform some other action or activity related to the present support session or unrelated to the present support session. It is recognized that, the customer may interrupt the playback at any time to ask questions.

Further, the support agent may transfer the current support session to a different support agent at any time. As one example, when the support agent selects and activates a particular common solution, the support agent may disconnect from the support session and redirect the support session to another support agent. As a further example, the support agent may determine that the chosen common solution should resolve the customer's request for information to the extent that the present support agent is able or prepared to assist. Accordingly, the present support agent may transfer the support session to a different support agent (e.g. a less experienced support agent or a more experienced, more senior support agent).

Further, in some embodiments, an avatar-based exchange may transition back and forth between utilizing PRS content and support agent content as the basis for control. In this example, method and system may enable transitioning a basis for the avatar-based exchange one or more times between at least one of: i) from the support agent content to the PRS content and/or ii) from the PRS content to the support agent content.

The example of FIG. 4C is provided in connection with enabling the support agent to select common solutions to pre-existing problems. Optionally, the process of FIG. 4C may additionally or alternatively be implemented in connection with enabling the support agent to select and demonstrate products. For example, at 440, the support agent may be presented with a list of potential products, from which to select. At 442, the support agent may select a product from a library. The support agent may then interact with the product (e.g., assemble furniture, show how accessories fit together) in the virtual environment of the support agent computing device 150 (FIG. 3), while the customer views a virtual illustration of the demonstration on the computing device 100. Accordingly, the support agent need not physically possess the actual product, but instead virtually interacts with the product through the CSA computing device 150.

The foregoing operations are iteratively performed until the support session ends. For example, the process of FIG. 4A-4C may end when a customer's issue is resolved or it is determined that further actions are warranted beyond an online support session. In accordance with embodiments herein, the avatar-based exchange enables customer support to be provided very quickly upon request from the customer, where the content of the exchange may be based in part upon prerecorded responses, such as PRS content, and based in part on support from one or multiple customer support agent. Throughout the support session, the customer is presented with a consistent and common support interface, through animation of the virtual character and the output of audio support content through the voice of the virtual character (and optionally any additional secondary video content).

Optionally, the processes described herein may be used with value added services such as when a customer requests a service person to come to the customer's home fix an appliance or home repair. For example, the customer may go online to schedule a service visit to the customer's home. When scheduling the service, a support session (as described herein) may be initiated and prerecorded support content, as well as a live support agent may interact with the customer through an avatar-based exchange to attempt to troubleshoot and/or solve the problem giving rise to the service request. For example, when a customer is scheduling service for a home security system, a support session may be initiated and seek to walk the customer through troubleshooting steps that may avoid waiting for a live service person to come to their home (e.g. changing the batteries in motion detectors, door and window sensors and the like). As another example, a customer may have a flat tire or other automotive trouble while on the road. The customer may utilize a smart phone, tablet device or other computing device to go online to request roadside assistance. In connection with scheduling the roadside assistance, a support session that may be initiated to show the customer where to locate the spare tire, jack and other tools, how to change the tire or otherwise troubleshoot a problem. If the support session is unsuccessful in solving the problem, the customer may then schedule the service visit.

Figure 5:
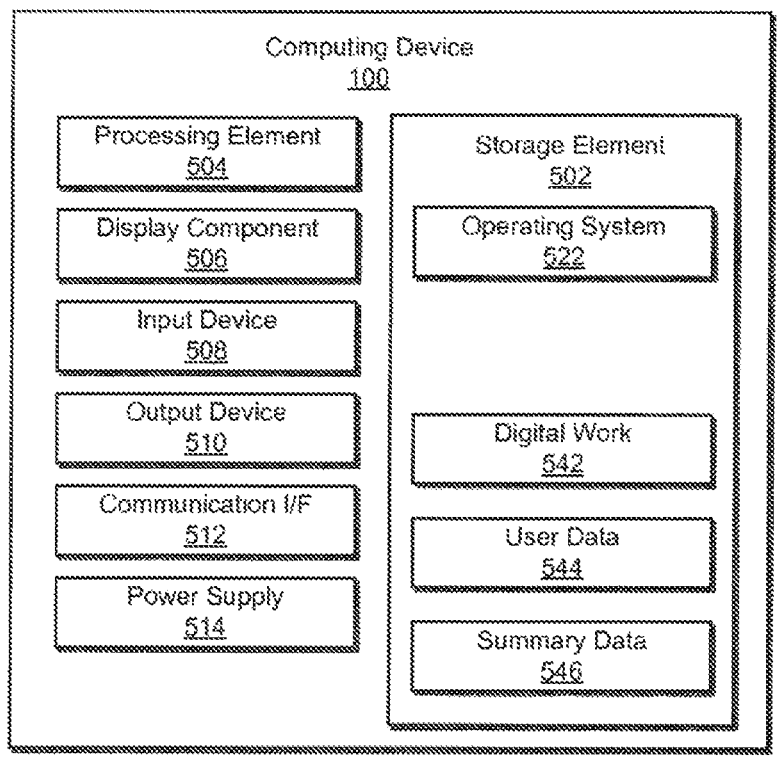
FIG. 5 illustrates an exemplary block diagram of a customer computing device in accordance with embodiments herein.

FIG. 5 illustrates an exemplary block diagram of a customer computing device 100, in accordance with embodiments herein. The computing device 100 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein. The electronic device 100 may not necessarily be a mobile or portable device, and thus, in some implementations may comprise a desktop personal computer, a gaming system, a television, other home electronics devices, and other devices providing media presentation functionality.

The computing device 100 may include a display component 506. The display component 506 may comprise, for example, one or more devices such as cathode ray tubes (CRTs), liquid crystal display (LCD) screens, gas plasma-based flat panel displays, LCD projectors, or other types of display devices, etc.

The computing device 100 may include one or more input devices 508 operable to receive inputs from a user. The input devices 508 can include, for example, a push button, touch pad, touch screen, wheel, joystick, keyboard, mouse, trackball, keypad, accelerometer, light gun, game controller, or any other such device or element whereby a user can provide inputs to the computing device 100. These input devices 508 may be incorporated into the computing device 100 or operably coupled to the computing device 100 via wired or wireless interface. For computing devices with touch sensitive displays, the input devices 508 can include a touch sensor that operates in conjunction with the display component 506 to permit users to interact with the image displayed by the display component 506 using touch inputs (e.g., with a finger or stylus).

The computing device 100 may also include at least one communication interface 512, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the computing device 100 may also include one or more wired communications interfaces for coupling and communicating with other devices.

The communication interface 512 may also include a cellular communications chipset or component that is configured to support one or more cellular communications links with a cellular network. The cellular component may be configured to provide the customer with a free of charge subscription, to a cellular service, but for a limited period of time or for a limited amount of data transfer (in total or in predetermined periods of time). Optionally, the cellular component may provide free lifetime cellular service, or a subscription-based Baylor service. The cellular component may be utilized to establish support sessions when the communication interface 512 is outside of a Wi-Fi service area. For example, when a customer initially purchases a new computing device 100, the customer may experience difficulties in interconnecting the computing device 102 a local Wi-Fi or other local area network. In this example, the customer may submit a request for assistance that is transmitted through the cellular component, with the cellular component maintaining a communications link during the support session. In this example, the avatar-based exchange, the CID information, PRS content, support agent content, CDU data and the like are passed to and from the computing device 100 through the cellular component.

In accordance with embodiments herein, the cellular component enables a support session to be maintained utilizing a low bandwidth communications link (e.g. through a 3G or 3G cellular network) while offering a high quality support experience. A low bandwidth communications link may be utilized as the avatar-based exchange captures, encodes and conveys "low frequency" demand data (e.g. data that does not require a very large bandwidth for transmission, such as CDU data, VCV audio data, documents) to the customer computing device 100. Optionally, the cellular component may be configured to be utilized only in connection with support sessions, absent the customer purchasing a separate cellular service. In this example, immediately upon purchase of the computing device 100, the customer would be afforded the ability to initiate a support session at any time (regardless of WiFi availability) and anywhere within a predefined base cellular service (e.g., Sprint, ATT, Verizon), without needing to set up a separate customer account with a cellular service.

The computing device 100 may also include a power supply 514, such as, for example, a rechargeable battery operable to be recharged through conventional plug-in approaches, or through other approaches such as capacitive charging. The computing device 100 also includes a processing element 504 for executing instructions and retrieving data stored in a storage element 502. As would be apparent to one of ordinary skill in the art, the storage element 502 can include one or more different types of memory, data storage or computer-readable storage media, such as, for example, a first data storage for program instructions for execution by the processing element 504, a second data storage for images or data and/or a removable storage for transferring data to other devices.

The storage element 502 may store software for execution by the processing element 504, such as, for example, operating system software 522. The storage element 502 may store the support application 302 (FIG. 3), including the communication module 304, a control module 306, character rendering module 305 and avatar animation library 368. The storage element 502 may also store data, such as, for example, files corresponding to one or more digital works 542, user data 544 relating to the user's consumption of those digital works 542 and other device metrics, and summary data 546 relating to the digital works 542, as will be described in greater detail below.

Figure 6:
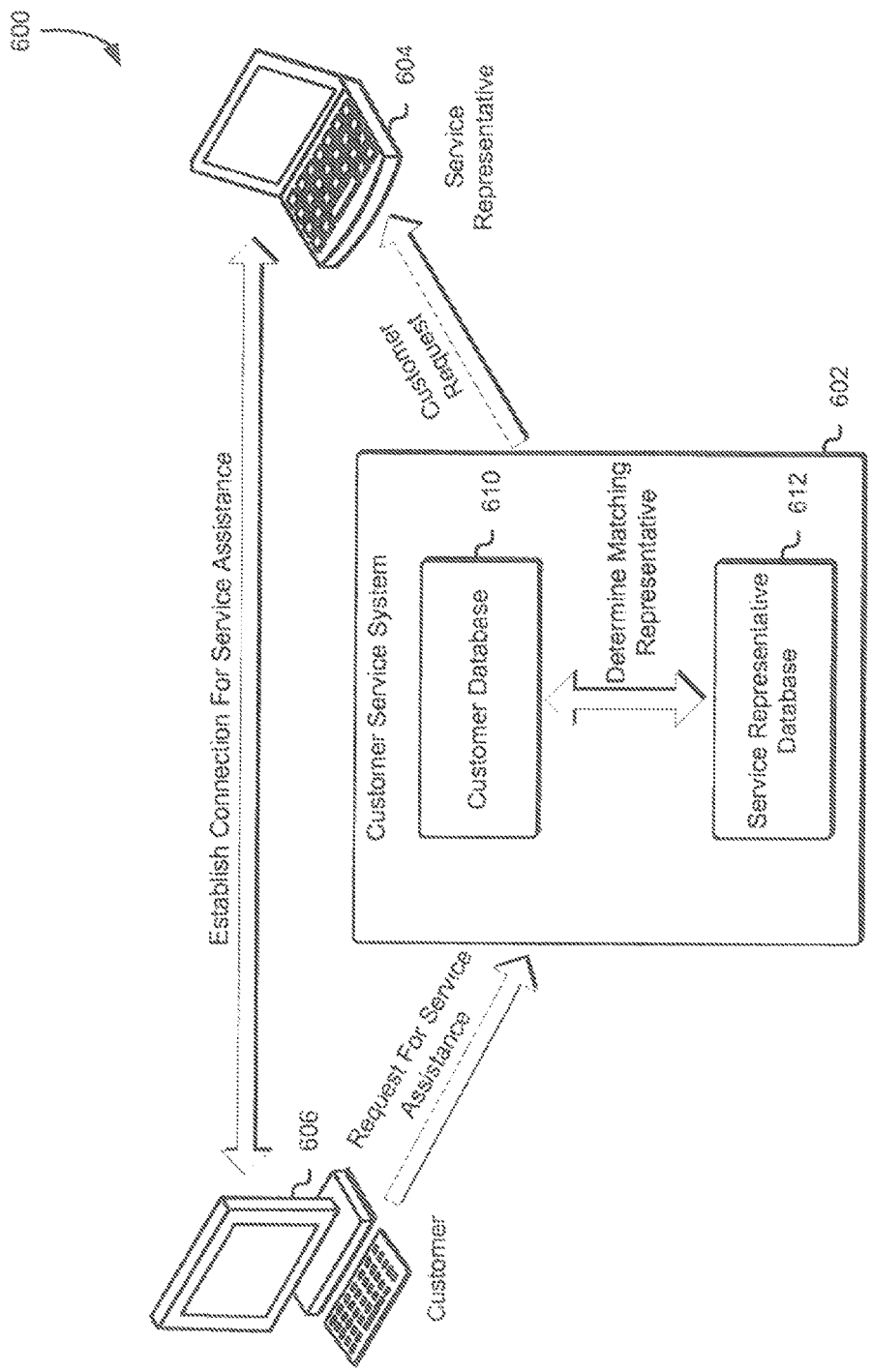
FIG. 6 shows an illustrative example of an environment in which a customer service system may select an appropriate support agent in accordance with at least one embodiment.

FIG. 6 shows an illustrative example of an environment 600 in which a customer service system 602 may select an appropriate support agent to provide customer assistance to a customer in accordance with at least one embodiment. In the environment 600, a user computing device 606 may submit a request, to the customer service system 602, to obtain assistance related to one or more features of a service provided by the service provider. For instance, the user computing device 606 may require assistance with accessing one or more music files purchased from the service provided by the service provider. The customer service system 602, in response to the request from the user computing device 606 for assistance, may access a customer database 610 to obtain one or more characteristics of the user computing device 606, as well as one or more preferences, which may be used to identify an appropriate support agent that may be able to assist the user computing device 606.

The customer database 610 may comprise a listing of one or more customers of the service provider, as well as a listing of characteristics and preferences for each of these one or more customers. For instance, when a user computing device 606 initially establishes a relationship with the customer service system 602 (e.g., creates a new account, utilizes a device provided to the user computing device 606 by a service provider for accessing the customer service system 602, etc.), the customer may be required to provide information regarding him or herself. For example, the user computing device 606 may provide the customer's name, home mailing address, billing address, age range, gender, known languages and the like. Further, the customer may be given the opportunity to define one or more preferences, which may be used by the customer service system 602 to identify a support agent that may assist the customer should the need arise. In an embodiment, if the customer has not specified one or more preferences which may be used to select a support agent, the customer service system 602 can access the customer database 610 and, based at least in part on the information included within the customer database 610 associated with the customer, utilize one or more algorithms to generate one or more preferences, which may then be stored within the customer database 610.

When the customer service system 602 receives a request, from the user computing device 606, for assistance from a support agent, the customer service system 602 may utilize the customer database 610 to obtain the customer's characteristics and preferences. The customer service system 602 may access a support agent database 612, which may comprise a listing of one or more support agents employed by the service provider to provide assistance to the customers of the service provider.

If the customer service system 602 identifies more than one support agent that satisfies the customer's preferences, the customer service system 602 may utilize one or more algorithms to select a support agent based at least in part on the similarities between the customer's characteristics and the characteristics of each of the support agents initially selected based at least in part on the customer's preferences. For instance, the customer service system 602 may be configured to utilize these one or more algorithms to rank the selected support agents based at least in part on these similarities. The highest ranked support agent may be selected to assist the customer. Once the customer service system 602 has selected an appropriate support agent from the support agent database 612, the customer service system 602 may transmit the customer request for assistance to the support agent's computing device 604.

Figure 7:
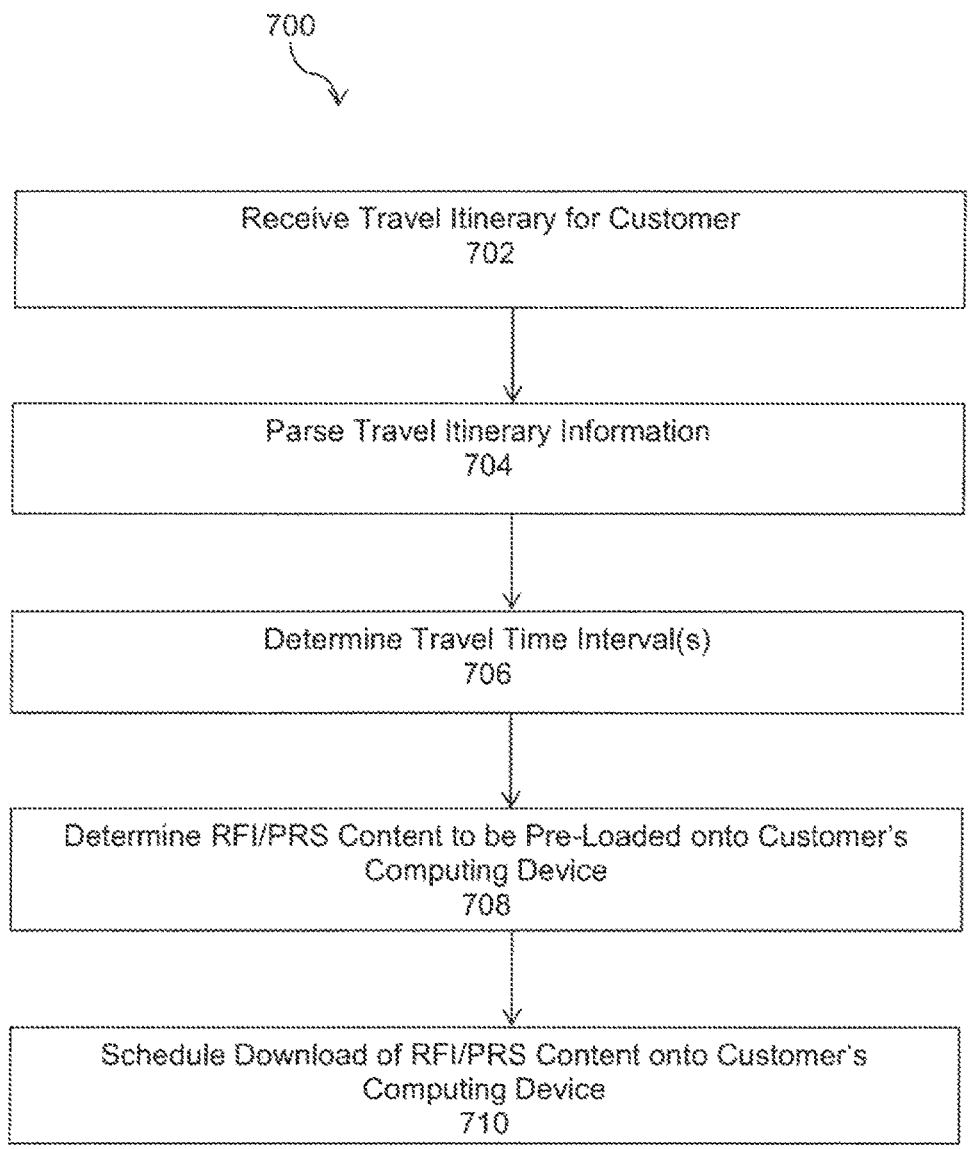
FIG. 7 shows an illustrative example of a process for scheduling download of common RFI/PRS content onto a customer's computing device based at least in part on a customer's travel itinerary in accordance with at least one embodiment.

In some embodiments, to manage pre-loading or pre-pushing common RFI and PRS content (collectively common RFI/PRS content) to customer computing devices, a support content provider may access a customer's user profile to determine when the customer's computing device may be available for receiving common RFI/PRS content that has been selected for the customer based at least in part on his/her preferences, his/her product, geographic location, local support usage trends, popularity of select PRS content and the like. For instance, the support content provider may access a customer's schedule to identify times when the customer is not travelling or busy in one or more meetings. In some embodiments, the support content provider may transmit a request to the digital content application installed on the customer's computing device to obtain this schedule, which may subsequently be stored within the customer's user profile. Based at least on this schedule, the support content provider may identify one or more times when common RFI/PRS content may be downloaded onto the customer's computing device. Accordingly, FIG. 7 shows an illustrative example of a process 700 for scheduling download of common RFI/PRS content onto a customer's computing device based at least in part on a customer's travel itinerary in accordance with at least one embodiment. The process 700 may be performed by the support network 300 (FIG. 3) and/or a support content provider, which may be configured to analyze a customer's schedule and preload/pre-push common RFI/PRS content to the customer's computing device as needed.

Optionally, the support content provider may identify a set of target customers that may receive a particular set of common RFI/PRS content. This set of target customers may be selected based at least in part on each customer's common RFI/PRS content preferences, past requests for information, frequent PRS and support agent content usage trends, and other external information. The support content provider, for a target customer, may determine that the customer's user profile includes a travel itinerary. Alternatively, the support content provider may transmit a request to the customer's digital content application to obtain any customer travel itineraries that may be used to determine the availability of the customer's computing device. Thus, the support content provider may receive 702 one or more travel itineraries for the customer.

Once the support content provider has obtained the customers travel itinerary, either from the digital content application installed on the customer's computing device or from the customer's user profile, the support content provider may parse 704 through the travel itinerary information and determine 706 the customer's travel time intervals for his/her travels. For instance, the support content provider may identify, from the itinerary, departure and arrival times, as well as destination cities/locations to determine where the customer will be located during his/her travels. The travel itinerary may also specify other important information that may be used by the support content provider. For instance, while the customer may be aboard a particular aircraft for a period of time, the aircraft may not provide network connectivity. Accordingly, the service may pre-push common RFI/PRS content associated with frequent in-flight or airport terminal problems/issues that customers have had in the past (or may otherwise experience). For example, when a customer is traveling through multiple terminals and/or foreign countries, the service may pre-push common RFI/PRS content associated with connecting the computing device to terminal networks, and otherwise using the computing device in the corresponding foreign country Based at least in part on the analysis of the customer's travel itinerary, the support content provider may determine 708 what common RFI/PRS content is to be pre-loaded onto the customer's computing device. For instance, the support content provider may again access the customer's user profile to determine the customer's content usage, preferences and trends. Utilizing this information, the digital service provider may identify any number of common RFI/PRS content segments that may be downloaded onto the customer's computing device prior to his/her travels.

Once the support content service has identified the common RFI/PRS content that is to be pre-loaded onto the customer's computing device, the support content service may schedule 710 download of the selected common RFI/PRS content onto the customer's computing device. The support content service may schedule download of the common RFI/PRS content prior to the customer's departure from any location based at least in part on the customer's travel itinerary. If network connectivity is adequate at the destination city, the support content provider may schedule download of three additional episodes prior to the customer's departure from the destination city. However, if network connectivity is not adequate at the destination city, the support content provider may schedule download of a greater amount of common RFI/PRS content prior to the customer's departure to the destination city.

Figure 8:
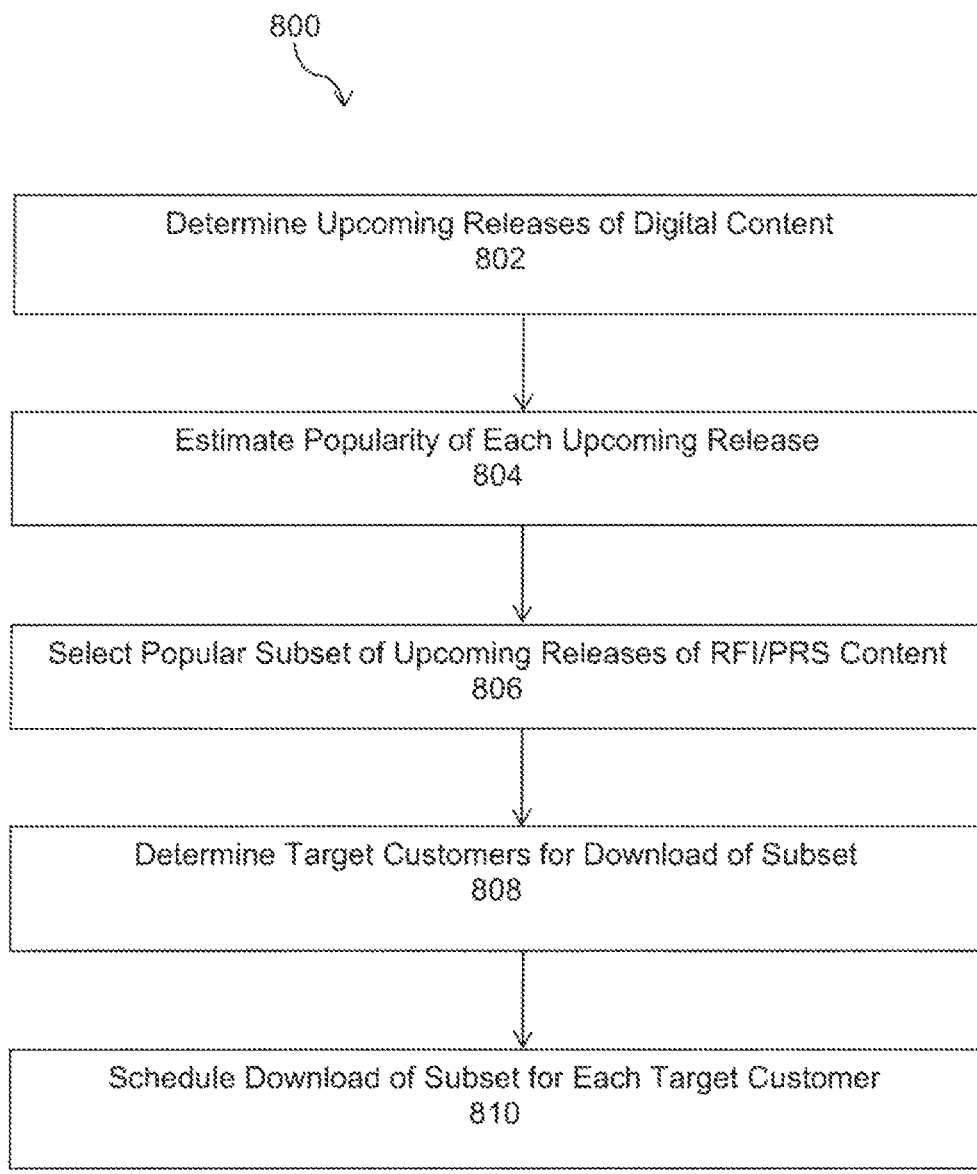
FIG. 8 shows an illustrative example of a process 800 for scheduling download of common RFI/PRS content for a plurality of customers based at least in part on an estimation of the popularity/usefulness of the common RFI/PRS content in accordance with at least one embodiment.

In some embodiments, a support content provider may receive a large volume of common RFI/PRS content from a variety of sources (e.g., in connection with operating system upgrades, new versions of applications, new features/functionality, a change in a cellular service network). Some of the common RFI/PRS content received from these sources may be popular/useful among the various customers of the support content provider that, if made available to these customer for streaming would potentially cause a significant impact on the network bandwidth utilization for the support content provider. To potentially avoid this issue, the support content provider may identify common RFI/PRS content that may be exceedingly popular upon release and transmit copies of this common RFI/PRS content to a set of customers that may be interested in accessing this common RFI/PRS content when it is made available for use. Accordingly, FIG. 8 shows an illustrative example of a process 800 for scheduling download of common RFI/PRS content for a plurality of customers based at least in part on an estimation of the popularity/usefulness of the common RFI/PRS content in accordance with at least one embodiment. The process 800 may be performed by the aforementioned support content provider, which may be configured to analyze a variety of customer user profiles, activity logs, popular search queries based at least in part on the frequency of each search query and satisfied by particular common RFI/PRS content, and other external information.

At any time, a support content provider may receive a variety of common RFI/PRS content from one or more publishers of common RFI/PRS content. Some of this common RFI/PRS content may be restricted for use by customers of the support content provider until a certain date, as established by the publisher or the support content provider. For instance, particular common RFI/PRS content may be stored within the digital content repository of the digital content service but may not be accessed by a customer for use for a few days or weeks. Based at least in part on these restrictions for use, the support content provider may determine 802 the upcoming releases of common RFI/PRS content for use by customers of the digital content service. An upcoming release may be defined by the support content service as common RFI/PRS content whose restriction date is in one week or less, although the support content service may utilize any time period as desired to define an upcoming release.

Once the support content provider has determined its upcoming releases of common RFI/PRS content, the support content provider may estimate 804 the popularity of each upcoming release. For instance, as noted above, the support content provider may access a variety of customer user profiles to identify the popularity of various search queries. Based at least in part on this information, the support content provider may select 806 a popular subset of the upcoming releases of common RFI/PRS content. For instance, the support content provider may identify the top ten releases that have the greatest potential popularity among customers of the support content provider for pre-loading onto customer computing devices. Alternatively, the support content provider may select a percentage of all upcoming releases that satisfy a particular estimated popularity threshold that may be provided to the customers of the support content provider.

Once the support content provider has selected the popular subset of the upcoming releases of common RFI/PRS content, the support content provider may determine 808 a set of target customers for download of the popular upcoming releases of common RFI/PRS content.

With the set of target customers identified for the popular upcoming releases of common RFI/PRS content, the support content provider may subsequently schedule 810 downloads of these upcoming releases to each customer's computing device. As noted above, the support content provider may review each customer's schedule, including any travel itineraries or other information that may be used to determine when the customer computing device will be available prior to release of the digital content. Additionally, the support content provider may consider each customer's Internet Service Provider (ISP) to determine if the ISP is known for throttling network bandwidth for downloads of digital content. The support content provider may determine whether a method is available to download the common RFI/PRS content bundled with other data to mask the nature of the common RFI/PRS content and thus prevent throttling of network bandwidth. However, if such methods cannot be discovered, the support content service may take this into consideration when scheduling download of the common RFI/PRS content, as more time may be required. Based at least in part on each customer's schedule, the support content provider may identify the best time periods when the common RFI/PRS content may be downloaded onto the customer's computing device. The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device 510 (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A non-transitory computer-readable storage medium having stored thereon executable instructions that, when executed by one or more processors of a computer system, cause the computer system to at least:

receive, from a customer computing (CC) device, a first request for assistance fulfillable by one of a plurality of support agent computing devices;
open a support session with the CC device;
determine one or more user-defined preferences associated with the CC device;
launch an avatar-based exchange, during the support session, with the CC device, wherein the avatar-based exchange includes:
  receiving customer issue definition (CID) information from the CC device regarding the first request for assistance;
  determining, based on the CID information, a virtual character to be presented on the CC device;
  providing pre-recorded support (PRS) content based on the CID information, the PRS content to be presented in combination with animation of the virtual character; and
  controlling the animation of the virtual character based on the PRS content;
receive, from the CC device, a second request for assistance from a live support agent;
determine, based on the one or more user-defined preferences associated with the CC device, a live support agent computing device from the plurality of support agent computing devices to provide assistance from the live support agent to the CC device using the virtual character; and
transition a basis for the avatar-based exchange from the PRS content to live support agent content such that the live support agent communicates with the CC device through the virtual character animated on the CC device, and virtual character switching from presenting the pre-recorded support (PRS) content based on the CID information and controlling the animation of the virtual character based on the PRS content to presenting input from the live support agent and controlling the animation of the virtual character using the live support agent content, the virtual character presenting a same spoken voice and appearance before and after the transition.

2. The non-transitory computer-readable storage medium of claim 1, further comprising executable instructions to cause the computer system to provide character definition and update (CDU) data representing changes in the virtual character to cause animation in the virtual character, wherein the CDU data is coordinated with the PRS content when the avatar-based exchange is based on the PRS content, and the CDU data is coordinated with responses from the live support agent computing device when the avatar-based exchange is based on the live support agent content, to provide a seamless transition in the avatar-based exchange to the live support agent.

3. The non-transitory computer-readable storage medium of claim 1, further comprising exectuable instructions to cause the computer system to direct animation of the virtual character to include changes in facial expressions of the virtual character based on changes in facial expressions of the live support agent.

4. A method comprising:
under control of one or more computer systems configured with specific executable instructions,
launch an avatar-based exchange, during a support session with a computing device, wherein the avatar-based exchange includes:
  receiving an initial request for assistance;
  determining one or more user-defined preferences associated with the computing device:
  determining, based on information associated with the initial request for assistance, a virtual character to be presented on the computing device;
  providing pre-recorded support (PRS) content based on the initial request, control of animation of the virtual character being based on the PRS content and presented in combination with the animation of the virtual character;
  receiving, from the computing device, a subsequent request for assistance from a live support agent;
  based on the one or more user-defined preferences associated with the computing device, determining a live support agent computing device from a plurality of live support agent computing devices to provide assistance from the live support agent to the computing device using the virtual character;
  providing live support agent content from the live support agent computing device, the live support agent content from the live support agent to be presented in combination with the animation of the virtual character;
  transitioning a basis for the avatar-based exchange from the PRS content to the live support agent content from the live support agent such that the live support agent communicates with a customer through the virtual character animated on the computing device; and
  controlling the animation of the virtual character based, at least in part, on the live support agent content, the virtual character presenting a same spoken voice and appearance before and after the transition.

5. The method of claim 4, wherein the live support agent communicates with the customer through virtual character voice (VCV) audio data generated based on live support agent voice audio data, the VCV audio data at least partially representing the live support agent content.

6. The method of claim 4, further comprising:
receiving customer issue definition (CID) information from the computing device regarding the initial request for assistance; and
providing the PRS content based on the CID information.

7. The method of claim 4, further comprising changing from a first live support agent to a second live support agent during the support session, the avatar-based exchange continuing to maintain a common virtual character that is animated based on live support agent content from the first live support agent, before the change, and based on live support agent content from the second live support agent, after the change.

8. The method of claim 4, further comprising: converting the live support agent content to character definition and update (CDU) data representing changes in the virtual character to cause the animation of the virtual character, and conveying the CDU data to the computing device.

9. The method of claim 4, further comprising accessing a collection of predetermined requests for information and corresponding common solutions, matching customer issue definition information to one of the predetermined requests for information, and providing the common solutions that correspond to the one of the predetermined requests for information as pre-recorded support content.

10. The method of claim 4, further comprising animating facial expressions presented by the virtual character based on the live support agent content.

11. The method of claim 4, wherein the live support agent content includes at least one of i) common greetings, one of which is presented at contact initiation by the virtual character or ii) a demonstration of a common problem resolution or feature.

12. The method of claim 4, wherein the PRS content is presented in combination with the animation of the virtual character based on customer issue definition information provided by the customer, wherein the PRS content is at least one of preloaded or prepushed to the computing device before the support session to enable the PRS content to be presented on the computing device before establishing the avatar-based exchange.

13. The method of claim 4 wherein the PRS content is based on customer issue definition information provided by the customer.

14. The method of claim 13, further comprising transitioning the basis for the animation and audio output of the virtual character between the PRS content and the live support agent content without changing a spoken voice or appearance of the virtual character.

15. A device, comprising:
a processor; and
a data store storing program instructions accessible by the processor;
wherein, responsive to execution of the program instructions, the processor is configured to:
launch an avatar-based exchange, during a support session, with a computing device, the avatar-based exchange including:
receiving an initial request for assistance;
determining one or more user-defined preferences associated with the computing device;
based on information associated with the initial request for assistance, determining a virtual character to be presented on the computing device;
providing pre-recorded support (PRS) content based on the initial request, control of animation of the virtual character being based on the PRS content and presented in combination with the animation of the virtual character;
based on a response to the PRS content from the computing device, determining interaction with a live support agent is needed;
based on the user-defined preferences, determining a live support agent computing device from a plurality of live support agent computing devices to provide assistance from the live support agent to the computing device using the virtual character;
providing live support agent content to be presented in combination with the animation of the virtual character;
transitioning a basis for the avatar-based exchange from the PRS content to the live support agent content such that the live support agent communicates with the computing device through the virtual character animated on the computing device; and
controlling the animation of the virtual character based, at least in part, on the live support agent content, the virtual character presenting a same spoken voice and appearance before and after the transition.

16. The device of claim 15, wherein the data store stores an avatar animation library comprising character definitions, character attributes and motion related attributes a plurality of components, the processor accessing the avatar animation library to generate character definition and update (CDU) data that is passed to the computing device to provide the animation of the virtual character.

17. The device of claim 15, wherein the PRS content includes one or more of:
i) common greetings, one of which is presented at contact initiation by the virtual character; or
ii) a demonstration of a common problem resolution or feature.

18. The device of claim 15, further comprising a prerecorded support content management module configured to manage at least one of creation, storage, updates, selection or presentation of PRS content.

19. The device of claim 15, further comprising a character definition and update (CDU) conversion module configured to at least one of:
i) convert live support agent voice audio data into virtual character voice audio data to be passed to the computing device for audio playback;
ii) select the virtual character from an avatar animation library to be utilized during the support session; or
iii) generate CDU data based on the PRS content, the CDU data conveyed to the computing device to animate the virtual character presented on the computing device.

20. The device of claim 15, further comprising a feature detection module configured to determine facial features and changes in facial features of the live support agent during the support session, wherein the avatar-based exchange is based, at least in part, on the facial features determined and changes in the facial features of the live support agent.

* * * * *

UNITED STATES PATENT AND TRADEMARK OFFICE
CERTIFICATE OF CORRECTION

| | | |
|---|---|---|
| PATENT NO. | : 10,354,256 B1 | Page 1 of 1 |
| APPLICATION NO. | : 14/581981 | |
| DATED | : July 16, 2019 | |
| INVENTOR(S) | : Michael James McInerny | |

It is certified that error appears in the above-identified patent and that said Letters Patent is hereby corrected as shown below:

In the Claims

In Claim 16 Column 38, Lines 15-17:
Where it reads:
"motion related attributes a plurality of components"
It should read:
--motion related attributes of a plurality of components--

Signed and Sealed this
Seventeenth Day of September, 2019

Andrei Iancu
*Director of the United States Patent and Trademark Office*